United States Patent
Olmsted-Thompson et al.

(10) Patent No.: US 10,587,673 B2
(45) Date of Patent: Mar. 10, 2020

(54) DECOUPLING NETWORK CONNECTIONS FROM AN APPLICATION WHILE THE APPLICATION IS TEMPORARILY DOWN

(71) Applicant: Nicira, Inc., Palo Alto, CA (US)

(72) Inventors: Jeremy Olmsted-Thompson, Seattle, WA (US); Mayank Agarwal, Kirkland, WA (US)

(73) Assignee: NICIRA, INC., Palo Alto, CA (US)

( * ) Notice: Subject to any disclaimer, the term of this patent is extended or adjusted under 35 U.S.C. 154(b) by 601 days.

(21) Appl. No.: 15/197,692

(22) Filed: Jun. 29, 2016

(65) Prior Publication Data
US 2018/0006958 A1 Jan. 4, 2018

(51) Int. Cl.
*G06F 15/173* (2006.01)
*H04L 29/08* (2006.01)
*H04L 12/24* (2006.01)

(52) U.S. Cl.
CPC ........ *H04L 67/025* (2013.01); *H04L 67/1034* (2013.01); *H04L 41/12* (2013.01)

(58) Field of Classification Search
CPC .......................... G06F 11/0748; H04L 67/1097
See application file for complete search history.

(56) References Cited

U.S. PATENT DOCUMENTS

| | | | |
|---|---|---|---|
| 6,701,324 B1 * | 3/2004 | Cochran | ........... G06F 17/30545 707/752 |
| 6,951,020 B2 | 9/2005 | Ricciardi | |
| 7,444,536 B1 | 10/2008 | Jairath | |
| 7,822,840 B2 | 10/2010 | Chen et al. | |
| 7,987,266 B2 | 7/2011 | Joshi et al. | |
| 8,296,267 B2 | 10/2012 | Cahill et al. | |
| 8,386,409 B2 | 2/2013 | Sanders et al. | |
| 8,782,632 B1 * | 7/2014 | Chigurapati | .............. G06F 8/65 717/172 |
| 9,055,139 B1 | 6/2015 | Devireddy et al. | |
| 9,104,745 B1 * | 8/2015 | Gutti | ................. G06F 17/30598 |
| 9,176,728 B1 | 11/2015 | Dixit et al. | |
| 9,229,707 B2 | 1/2016 | Borissov et al. | |
| 2002/0095522 A1 | 7/2002 | Hayko et al. | |
| 2003/0177209 A1 * | 9/2003 | Kwok | ..................... H04L 45/00 709/221 |
| 2006/0052898 A1 | 3/2006 | Blumenfeld et al. | |
| 2006/0075076 A1 * | 4/2006 | Sinha | .................. G06F 9/45558 709/220 |
| 2006/0190581 A1 | 8/2006 | Hagale et al. | |
| 2006/0271826 A1 | 11/2006 | Desai et al. | |
| 2007/0110070 A1 | 5/2007 | Chang et al. | |
| 2007/0124475 A1 | 5/2007 | Syed et al. | |

(Continued)

*Primary Examiner* — Umar Cheema
*Assistant Examiner* — Tesfu N Mekonen
(74) *Attorney, Agent, or Firm* — Adeli LLP

(57) ABSTRACT

Some embodiments provide a method for saving data communicated with an application during the application downtime. The method, in some embodiments, receives incoming data from an interface of a machine. The incoming data includes data that is originated by different resources to be sent to a particular application that executes on the machine. The method forwards the incoming data to the particular application when the particular application is available, and forwards the incoming data to a data storage to be buffered when the particular application is unavailable for receiving the incoming data.

23 Claims, 11 Drawing Sheets

(56) References Cited

U.S. PATENT DOCUMENTS

| | | | |
|---|---|---|---|
| 2008/0276130 A1* | 11/2008 | Almoustafa | H04L 41/069 714/47.1 |
| 2009/0006884 A1 | 1/2009 | Cahill et al. | |
| 2009/0106350 A1 | 4/2009 | Chen et al. | |
| 2009/0276771 A1 | 11/2009 | Nickolov et al. | |
| 2011/0138374 A1* | 6/2011 | Pal | G06F 8/656 717/169 |
| 2012/0005542 A1* | 1/2012 | Petersen | G06F 11/0709 714/48 |
| 2012/0030670 A1* | 2/2012 | Vijay | G06F 9/45558 718/1 |
| 2012/0089568 A1* | 4/2012 | Manley | H04L 47/10 707/634 |
| 2012/0239616 A1 | 9/2012 | Cunningham et al. | |
| 2012/0284712 A1 | 11/2012 | Nimmagadda et al. | |
| 2013/0031201 A1* | 1/2013 | Kagan | G01D 4/004 709/213 |
| 2013/0132545 A1 | 5/2013 | Schultze et al. | |
| 2014/0101487 A1 | 4/2014 | Kakadia et al. | |
| 2015/0215406 A1 | 7/2015 | Eggert et al. | |
| 2016/0041819 A1 | 2/2016 | Mantena et al. | |
| 2016/0182336 A1* | 6/2016 | Doctor | H04L 43/062 709/224 |
| 2016/0285872 A1* | 9/2016 | Polar | H04L 63/0876 |
| 2016/0301601 A1* | 10/2016 | Anand | H04L 47/12 |
| 2017/0171156 A1 | 6/2017 | Schultz et al. | |
| 2017/0180487 A1* | 6/2017 | Frank | H04L 67/16 |
| 2017/0201914 A1 | 7/2017 | Dong et al. | |
| 2017/0324847 A1 | 11/2017 | Good et al. | |
| 2018/0007162 A1* | 1/2018 | Olmsted-Thompson | H04L 67/2852 |

* cited by examiner

DECOUPLING NETWORK CONNECTIONS FROM AN APPLICATION WHILE THE APPLICATION IS TEMPORARILY DOWN

BACKGROUND

Network users (e.g., physical and/or logical network administrators) rely on event monitoring applications to identify and address potential network issues. An event monitoring application receives network events from different network elements (e.g., forwarding elements, applications, machines, etc.) and provides network data analysis based on the received events. As such, reducing downtime (e.g., during upgrade) for a log application has always been a priority. Any downtime (even a planned downtime) for an event monitoring system may carry considerable costs. Serious problems may arise when a single and important log (event) is generated and reported to a log application while the application is down. For a distributed log application that executes on a cluster of machines (e.g., virtual servers), event loss can be minimized by employing load balancing and failover techniques. Even using these techniques, however, does not guarantee that at a critical time during failover, one or more events are not lost. Additionally, clustering a log application presents its own challenges such as inter-node traffic security issues and management of the cluster's network topology.

BRIEF SUMMARY

Some embodiments provide a method for decoupling network connections from an application during the application's downtime. By decoupling the network connections from the application, the connections remain open for receiving incoming data while the application is offline. The method of some embodiments decouples all of the current network connections, as well as any new incoming connection, when the application is temporarily down (e.g., while the application is being upgraded). Some embodiments provide a proxy instance as an intermediary between an application and an interface of a device, on which the application executes, in order to decouple the connections from the application. Such a proxy instance prevents loss of network data communicated with an application, when the application is offline.

The proxy instance is a lightweight process that executes in a user space of a machine in some embodiments (e.g., operating in a container). The proxy instance receives incoming data that is sent to an application from a network interface of a device (e.g., a physical machine, a virtual machine, etc.) and forwards the received data to the application. When the application is temporarily offline (e.g., during an upgrade period), the proxy instance redirects the incoming connections (i.e., current and new connections) to a buffer (e.g., in a data storage). When the application is back online (e.g., upon completion of the upgrade process), the proxy instance opens new connections to the application and forwards the buffered data back to the application through the newly opened connections.

The proxy instance, in some embodiments, is an intermediary between a logging and monitoring application (referred to as a log application hereinafter) and an interface that receives different event messages, sent to the log application, from different network elements (e.g., a forwarding element, a virtual server, etc.). In some embodiments the same log application generates different network analysis reports based on the received events, while in other embodiments another analytical system receives the log data from the log application and generates the required reports (e.g., in response to a network administrator's query, automatically based on importance level of events, etc.).

In some embodiments, an event logging protocol (e.g., a syslog protocol) is deployed by different network devices (physical and/or logical devices) such as routers, switches, firewalls, servers (Unix server, Windows server, etc.), etc., to send the log (event) messages to a log application that runs on a log server (or on a cluster of log servers). The logging protocol of some embodiments, in addition to sending the log messages to a log server, stores the log messages locally in the devices that generated these messages. The log application (alone or in conjunction with other applications) collects, organizes, and filters the received logs. As an example, a router (a physical or logical router) can generate a log message when an interface of the router goes down or its configuration is changed. As another example, a web server might send an access-denied event to a log server when an unauthorized user tries to connect to the web server.

The logging protocol, in some embodiments, uses a transport layer protocol such as User Datagram Protocol (UDP) to transmit the event messages across the network. In some such embodiments, the logging protocol uses a particular UDP port number (e.g., UDP port 514) to send the log messages to a log server, while a log application running on the log server listens on this particular port for received log events. Since UDP is a connectionless protocol, no confirmation or acknowledgment is received back from the log server. Lack of acknowledgment can translate to missing an event (however important) when the event message (i.e., one or more packets in the message) does not reach the log application. For this reason, some network devices, instead of UDP, use the Transmission Control Protocol (TCP) as the transport layer protocol. However, TCP can also be prone to loss of network events at critical moments. As an example, when a log server is overloaded and cannot accept any more messages, an important TCP log message could easily be missed by the server.

Log (event) messages usually include basic information about where, when, and why the log was generated and sent, which can help to identify the source of a network issue. This basic information may include Internet Protocol (IP) address of the sender device, timestamp (i.e., the time the log message is generated), a severity level of the log message (indicating how important the message is), the actual log message (e.g., describing a change in a forwarding element's configuration), etc.

A log application is a standalone application (i.e., a single application executing on a single log server) in some embodiments, while in other embodiments, the log application is a distributed application, several instances of which execute on several different devices in a cluster (e.g., a cluster of virtual log servers). Some embodiments implement the method of decoupling network connections from a log application differently based on whether the log application is a standalone application or a distributed application. For a standalone log application, some embodiments provide a proxy instance that is bound to one or more port numbers of a network interface (of a log server) that were originally allocated to the log application. The proxy instance of some such embodiments listens on these allocated ports for any incoming network connections and the log application listens on a local host (e.g., on a loopback interface) instead.

The port numbers of an external interface of a device that are dedicated to a log application and on which the proxy instance listens, in some embodiments, are divided to (1) log ports, through which the different generated log events are received and (2) admin ports, through which admin queries and other API calls are received. Instead of listening on these dedicated ports, the log application listens on a loopback interface (also referred to as a local host) that is dedicated to only internal communications of the device. Through the loopback interface the log application receives the incoming events from a proxy instance. That is, the proxy instance mirrors incoming connections to the log application through the loopback interface, when the log application is active and online. By default, the proxy instance simply passes the received data through to the log application to minimize the overhead. However, when the proxy instance is notified of an upgrade event (e.g., from a controller of the network), the proxy instance starts redirecting the incoming traffic to a disk-backed buffer. In some embodiments, however, not all of the network traffic destined for the log application is buffered during the application's downtime.

In some embodiments, only the log data which arrives at a log port of the interface is buffered by the proxy instance when the log application is offline. That is, other data sent to the log application (e.g., admin and UI queries, and other API calls, collectively referred to as API calls or API data hereinafter) are simply rejected/denied at the external interface of the device and won't be buffered by the proxy. In other words, in some embodiments, during the downtime, all the connections (current and new) to a log port of an external interface will be redirected to a buffer, while the current connections to the log application through other ports such as an API port will be closed and any new connections of this kind will be rejected.

The reason for denying the API calls at the interface is that some embodiments use other protocols than UDP to transmit API calls, and as such the API calls are buffered at the sender's side when the sender does not receive an acknowledgment back. That is, when a sender application (e.g. a network management application running on a manager machine) sends a packet (e.g., an HTTP packet in an API call) to a log application and does not receive an acknowledgement back from the log application (because the application is down), the sender application buffers the packet for resubmission. Therefore, this type of data is not required to be buffered for a second time at the log application side (by the proxy instance).

It is important to note that a log port (or an API port) of an interface is not necessarily a physical port of a physical interface in some embodiments. For instance, a log port may include a particular port number (e.g., in a transport layer protocol) which is allocated to log messages defined in a logging protocol. When a packet of an event message that carries the particular port number in one of the packet's headers (e.g., L4 destination address) reaches the interface, the packet is said to be arrived at the particular port of the interface. In some embodiments, the interface that receives the events can be a virtual interface (e.g., of a virtual machine) and not necessarily a physical interface.

For large networks (e.g., datacenter networks) with a large number of network resources capable of generating network events, a standalone log application running on a single machine might not be sufficient to handle the event monitoring task. Instead, a distributed log application that runs on a cluster of log servers performs the event monitoring functionality. In a clustered implementation of the log application, where several different log servers of a cluster execute different instances of the log application, when one of the log servers is down, the connections of that server can be redirected to another server of the cluster. That is, when an instance of the log application running on a node (i.e., a log server) of the cluster fails, an integrated load balancer fails over connections with the failed log instance to another instance of the application that executes on another node of the cluster.

During the failover process, however, the possibility of losing one or more event messages still exists (e.g., during the switching time from one node to another). Therefore, a proxy instance that redirects and buffers incoming log data for an offline instance of the distributed log application is still required. For API traffic sent to an offline log instance, however, instead of denying new API connections, some embodiments close the existing API connections and redirect new connections to another node of the cluster. Some embodiments redirect the incoming API traffic to other available instances of the log application in a particular manner. For example, for each new connection that is received, some embodiments redirect the connection to a different node of the cluster using a round-robin pattern. Other embodiments use other methods for redirecting the connections.

Forwarding new API connections to other nodes allows new connections (e.g., HTTP connections) continue to be made throughout the upgrade process of a log instance, without any change in buffering the event data. Once the upgrade is completed, some embodiments close the connections to the remote instance of the log application and create new connections to the local and upgraded instance of the log application. In order to redirect the connections to remote nodes, a local proxy instance should be able to communicate to other remote instances of the log application in a manner other than through a loopback interface (through which a proxy instance communicates with a standalone log application). This is because the loopback interface can only be used for internal communications inside a device and no data can be passed to a remote node through deployment of a loopback interface.

In a clustered implementation of a log application, some embodiments employ a virtual interface of an overlay network between each pair of local proxy instance and local log instance (of the distributed log application). In some embodiments, instead of binding to a loopback interface, a local log instance is bound to its corresponding virtual interface. The local proxy instance of some such embodiments forwards the incoming log and API data to the local log instance through this virtual interface when the log instance in active and online. When the local log instance is offline, however, the local proxy instance (1) buffers the log data in the same manner the log data is buffered for a standalone log application, and (2) redirects the incoming API data (instead of rejecting this data) to a remote log instance running on a remote node of the cluster using the same virtual interface.

Some embodiments establish a tunnel (in the overlay network) between a virtual interface of the local node and a virtual interface of a remote node and tunnel the API packets to the remote virtual interface to be forwarded to a corresponding remote log instance. That is, the local virtual interface encapsulates the incoming packets received from a proxy instance with a destination address of the remote virtual interface using a particular tunneling protocol (e.g., VXLAN, Geneve, STT, etc.) before sending the packets to the remote virtual interface. When the remote virtual interface receives the encapsulated packets, it decapsulates the packets and forwards them to the remote log instance to process the packets (e.g., to respond to a UI query). Running on top of an overlay network ensures any traffic sent to a log application's ports not exposed by the proxy is generated by an approved node, and as such there is no need for verifying cluster membership for every internal API request.

As described above, a proxy instance decouples network connections to an application and buffers event data that is sent to the application during the application's downtime. Some embodiments provide a novel method for upgrading a proxy instance without any interruption in providing the above-described services by the proxy. In other words, some embodiments decouple network connections from a proxy instance itself, when an upgraded version of the proxy instance is available, and couple the connections to an upgraded version of the proxy instance without interrupting the services the proxy provides.

A proxy instance, in some embodiments, is a process instantiated in a kernel or user space of a machine. In some embodiments, a machine (or a hypervisor in charge of the machine) instantiates the proxy instance based on configuration data the machine receives from a management and controller system of a network to which the machine is coupled. When an updated version of a proxy instance is available, some embodiments instantiate an updated version of the proxy instance in the machine in parallel with the old version of proxy instance (instead of upgrading the old version of proxy instance).

The management and control system of a network generates and pushes configuration data to a set of physical nodes (e.g., host machines, gateway machines, etc.) in order to configure the physical nodes to implement different network elements (e.g., different forwarding elements). Additionally, the management and control system generates and pushes configuration data to a log server for configuring and instantiating a proxy instance on the log server, on which the event monitoring application also executes.

The management and control system of some embodiments also generates and pushes configuration data to each host machine that hosts different end machines of a network in order to configure the host machines to implement a particular module for communicating with the log server. The particular module (e.g., a log agent operating in a virtualization softer of a host machine) is responsible for (1) receiving different events generated by different network elements running on the host machine (e.g., events generated by forwarding elements, virtual machines, hypervisor, etc.) and (2) forwarding the received events to the log server.

After instantiating an upgraded version of a proxy instance, some embodiments set a flag in the newly instantiated proxy instance, which instructs the upgraded proxy instance to retrieve connections from the old proxy instance instead of creating new connections. In order to receive the current connections from an old proxy (i.e., an old version of the proxy), the upgraded proxy opens a new inter-process communication (IPC) socket (e.g., a Unix domain socket) and asks the old proxy (through an API call) to send all of its connections to the upgraded proxy through the socket. Upon receiving a connection transfer request from the upgraded proxy, the old proxy of some embodiments sends, on the specified socket, a set of file descriptors, each of which handles one of the connections to the upgraded proxy.

In some embodiments, upon receiving the set of file descriptors from the old proxy, the upgraded proxy instance creates new network connections for receiving the incoming data (e.g., from an interface) using the received file descriptors and begins listening on the newly created connections. At this point, the old proxy instance of some embodiments stops listening on its connections so that all new incoming data could be received by the upgraded proxy instance. As soon as the upgraded proxy instance is activated and starts listening on the log application ports for new data, the old proxy instance stops listening on these ports. After the old proxy instance stops communicating with the network interface, some embodiments remove the old proxy from the machine. This way, there is no downtime for upgrading a proxy instance and no interruption of the services provided by the proxy instance.

The proxy instance, described in the above-mentioned embodiments, can be used for many other reasons and not merely during the downtime of a log application. Providing an access point for additional services could be another reason for decoupling incoming connections from an application using a lightweight proxy instance. Some examples for these additional services include, but are not limited to, securing all inter-node communications (e.g., in a log server cluster), throttling traffic to simulate poor network conditions (e.g., during system development), recording traffic (e.g., for debugging), etc.

For example, a policy to forward all incoming data to a remote node while maintaining the original behavior for a system can be defined. Through such a policy, a test cluster that will receive the same data as production can be set up. As such, changes can be tested with real, live data without having to upgrade an in-use cluster and more effectively evaluate real world performance without having to impact the users. Alternatively, another policy for copying the live traffic to a disk to be replayed later can be defined which can be used to capture events during a particularly demanding period and to replay the captured events to test future performance enhancements.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
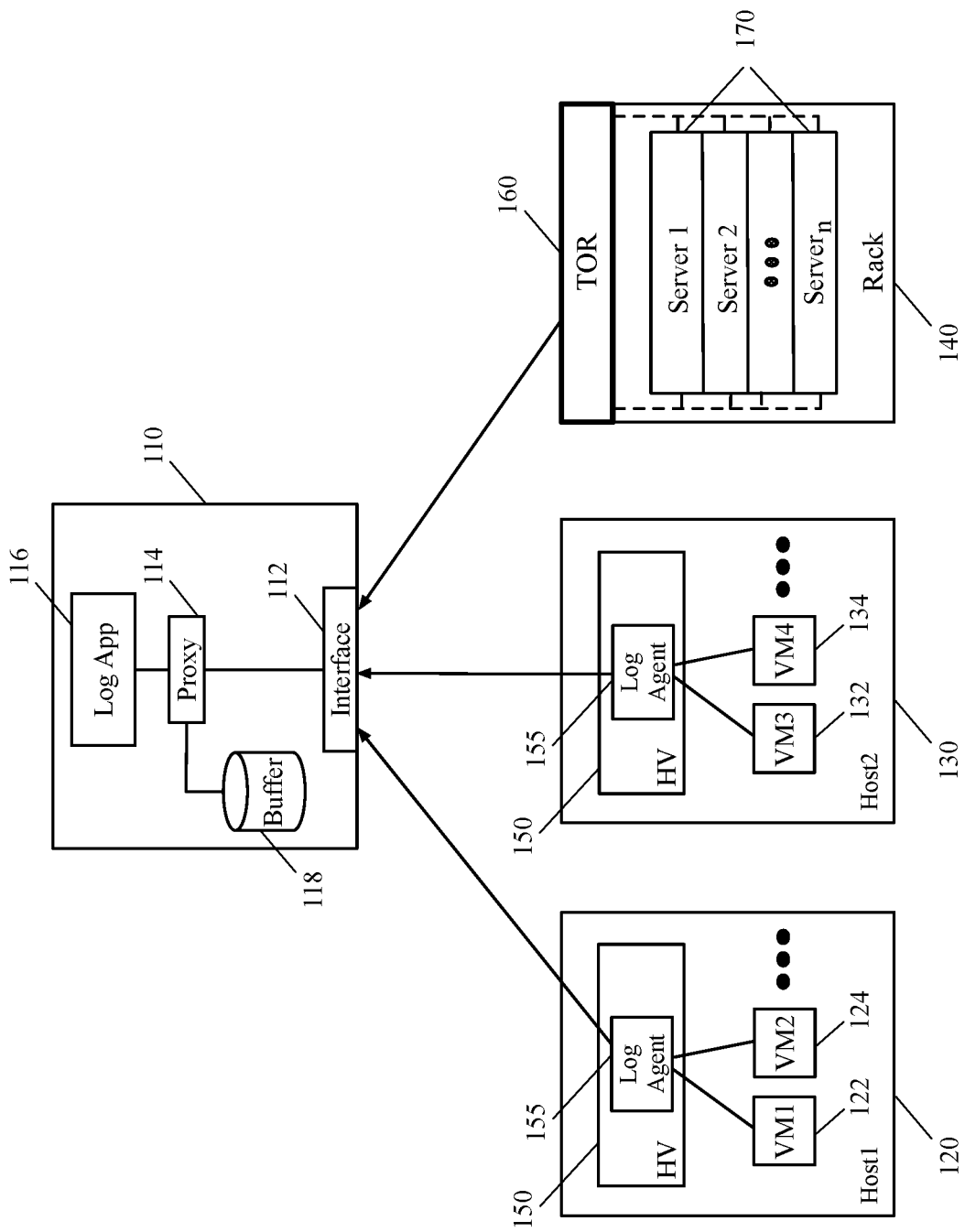
FIG. 1 illustrates an example of a proxy instance that operates in a log server as an intermediary between a log application and network interface of the log server.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for decoupling network connections from an application during the application's downtime. By decoupling the network connections from the application, the connections remain open for receiving incoming data while the application is offline. The method of some embodiments decouples all of the current network connections, as well as any new incoming connection, when the application is temporarily down (e.g., while the application is being upgraded). Some embodiments provide a proxy instance as an intermediary between an application and an interface of a device, on which the application executes, in order to decouple the connections from the application. Such a proxy instance prevents loss of network data communicated with an application, when the application is offline.

The proxy instance is a lightweight process (e.g., operating in a container) that executes in a user space of a machine in some embodiments. The proxy instance receives incoming data that is sent to an application from a network interface of a device (e.g., a physical machine, a virtual machine, etc.) and forwards the received data to the application. When the application is temporarily offline (e.g., during an upgrade period), the proxy instance redirects the incoming connections (i.e., current and new connections) to a buffer (e.g., in a data storage). When the application is back online (e.g., upon completion of the upgrade process), the proxy instance opens new connections to the application and forwards the buffered data back to the application through the newly opened connections.

The machine on which the proxy instance and log application of some embodiments execute can be a physical machine or any other type of a data compute node (DCN) such as a virtual machine (VM), a container, etc., that instantiates and executes on another machine (e.g., a host machine). Additionally, a DCN of some embodiments can be an end machine (e.g., a VM) in a set of end machines of a logical network that run on one or more host machines of a hosting system (e.g., a datacenter). These end machines are logically connected to each other and to other end machines of other networks (logical and/or physical networks) through a set of logical forwarding elements of the logical network. The set of logical forwarding elements is implemented by one or more managed forwarding elements that operate (executes) on each host machine in some embodiments. A managed forwarding element, operates in a virtualization software (e.g., a hypervisor) of a host machine. The set of logical forwarding elements is also implemented by one or more hardware forwarding elements through physical ports of which, a set of physical machines logically connects to the logical network.

A logical network, in some embodiments, in addition to several different L2 and L3 logical forwarding elements (e.g., logical switches and logical routers), includes other logical network elements (e.g., logical firewall, logical load balancer, etc.) that are placed on different logical paths of the logical network. Through these logical network elements several different DCNs that run on different host machines connect to each other, to other physical machines of the logical network (e.g., physical machines connected to managed hardware forwarding element such as top of rack (TOR) switches, hardware routers, etc.), and to other end machines of other networks.

In some embodiments, a user defines a logical network topology (i.e., defines the logical network elements and the connections between these elements) for a logical network through a management plane of the logical network. The management plane of a logical network, in some embodiments, includes one or more manager machines (or manager applications) through which the different logical network elements are defined (through API calls). The management plane pushes the network elements' data to the control plane of the logical network (e.g., one or more controller computers (or applications) that control the data exchanges between the managed forwarding elements in the logical network). The management and control planes push the configuration data to a set of physical nodes (e.g., host machines, gateway machines, etc.) in order to configure the physical nodes to implement the logical network.

In some embodiments, the management and control system configures a particular DCN (e.g., a virtual log server) that executes an event monitoring application to implement a particular process that acts as a proxy for the event monitoring application. This particular proxy instance decouples network connections to the event monitoring application from the application when the application is down. In order to configure the DCN, in some embodiments, the management and control system configures a hypervisor of a particular host machine that hosts the DCN to instantiate the proxy instance on the DCN. In some embodiments, the hypervisor of host machine configures the DCN to instantiate and run the proxy instance based on the received configuration data.

FIG. 1 illustrates an example of a proxy instance that operates in a log server as an intermediary between a log application and network interface of the log server and how the log server communicates with different machines to receive network events from these machines. More specifically, this figure shows a proxy instance that (1) receives log data from different log agents operating on different machines through a network interface of the log server and (2) forwards the received data either to a log application, or to a buffer, depending on the status of the log application. The figure includes a log server 110, two host machines 120 and 130, and a rack 140. The log server 110 includes a network interface controller (NIC) 112, a proxy module 114, an event monitoring application 116, and a buffer 118. The rack 140 includes a set of servers 170, as well as a hardware TOR switch 160. Each host machine includes a hypervisor 150 that executes a log agent 155 and hosts a set of virtual machines.

Although not shown in the figure, a management and control system of the network generates and pushes (e.g., through management and control planes) configuration data to the host machines 120 and 130, and the TOR switch 160 in order to configure these physical nodes to implement different network elements of one or more logical networks (e.g., that belong to one or more tenants of a hosting system). Additionally, the management and control system generates and pushes configuration data to the log server 110 for configuring and instantiating the proxy instance 114 on the log server. The log server 110 can be a virtual server (e.g., a VM) that runs on a particular host machine (not shown) dedicated for receiving and organizing network events, or alternatively, it can be a physical server that is dedicated as a log server. As will be described in more detail below, when a log server is a VM, the network interface controller 112 is also a virtual NIC (VNIC). Such a VNIC connects to a managed forwarding element that operates in the hypervisor of the particular host machine.

The management and control system of some embodiments also generates and pushes configuration data to the hypervisors 150 of the host machines in order to configure each of the hypervisors to implement a log agent (i.e., log agents 155) for communicating with the log server 110. Each of the log agents 155 is responsible for (1) receiving different events generated by different network elements running on a corresponding host machine and (2) forwarding the received events to the log server 110. The events may include events generated by logical switches and routers implemented by the hypervisors, events generated by virtual machines operating on the host machines, events generated by the hypervisor or any other hardware element of the host machines, etc.

The TOR switch 160 is also configured (e.g., by the management and control system or by a third party) to forward the network events related to the servers 170, or the TOR switch 160 itself, to the log server 110. In some embodiments, the TOR switch 160 is a managed third-party hardware switch that when configured by the management and control system, implements one or more logical networks and logically connects the physical workload attached to it (e.g., physical servers 170 connected to different ports of the TOR switch 160) to the virtual machines and other logical network elements. The servers 170 may include host machines of the same hosting system or any other physical computing device such as a computer, a printer, etc.

A logical network (e.g., for a tenant of a datacenter) may logically connect a subset of VMs that operates on the host machine 120 to (1) a subset of VMs that operates on the host machine 130, (2) to a subset of physical servers 170 in the rack 140, and (3) to any other external physical and/or logical network (not shown). The different network elements of such a logical network (e.g., logical switches and routers that are implemented by the hypervisors 150 and TOR switch 160, virtual machines VM1-VM4, etc.) generate different network event messages while operating in the network, and forward these event messages to the log server 110.

As an example for a logical network topology in the illustrated figure, a logical network may logically connect VMs 122 and 124 running on the host machine 120, to VMs 132 and 134 running on the host machine 130. Although not shown, the logical connections of the VMs do not necessarily follow the physical connections of these VMs in the illustrated physical network. For example, VMs 122 and 132 (VM1 and VM3) might be connected to a first logical switch (LS1), while VMs 124 and 134 (VM2 and VM4) are connected to a second logical switch (LS2), which is connected to the first logical switch (e.g., through a logical router).

In some embodiments, the connections of the VMs to logical switches (e.g. the first and second logical switches LS1 and LS2 described above) are defined using logical ports of the logical switches, which are mapped to the physical ports of one or more managed forwarding elements (MFEs) operating in the hypervisors of the host machines (not shown). For example, in the above given example, a first logical port of LS1 is mapped to a physical port of a first MFE that is coupled to VM1 running on the host machine 120, and a second logical port of LS1 is mapped to a physical port of a second MFE that is connected to VM3 running on the host machine 130. The first MFE executes in hypervisor 150 of the host machine 120, while the second MFE executes in hypervisor 150 of the host machine 130. Similarly, VMs 122 and 132 could be logically connected to one or more of the servers 170 through a third logical port of LS1 which is mapped to a physical port of the TOR switch 160.

When the first MFE receives a packet from VM1 that couples to the first port of LS1, the first MFE performs network forwarding processing for LS1. The same MFE, also performs forwarding processing for any additional logical forwarding element (e.g., a logical router that connects the first and second logical switches, the second logical switch, etc.). Based on the forwarding processing, the first MFE decides where to send the received packet (e.g., to the second MFE running on the host machine 130 or to the TOR switch 160).

As described above, the management and control plane is responsible for, among other things, generating, configuring, and managing different logical elements (e.g., logical switches, logical routers, logical middleboxes, etc.) that a user defines. The management and control plane manages and controls the network data communication between the different VMs of a logical network by controlling the data communications between the software MFEs and hardware managed switches (TOR) that implement the logical forwarding elements. The management and control plane communicates with the managed switches in order to control the data exchange between these switches as virtual tunnel endpoints (VTEPs) that ultimately exchange the logical network data between the DCNs.

The NIC 112 receives the different network events (also referred to as log messages or logs) from different log agents that operate on the host machines 120 and 130, as well as the TOR switch 160. Log messages include basic information about where, when, and why the log was generated and sent, which can help to identify the source of a network issue.

This basic information may include Internet Protocol (IP) address of the sender device, timestamp (i.e., the time the log message is generated), a severity level of the log message (indicating how important the message is), the actual log message (e.g., describing a change in a forwarding element's configuration), etc.

In some embodiments, an event logging protocol (e.g., syslog protocol, combination of Windows Event Log protocol with other tools) is deployed by different network devices such as logical forwarding elements (e.g., routers, switches, firewalls), managed forwarding elements and TOR switch 160 that implement the logical forwarding elements, servers 170, VMs, etc. to send the log (event) messages to the log application 116 that runs on the log server 110. The logging protocol of some embodiments, in addition to sending the log messages to the log server 110, may store the log messages locally in the devices that generated these messages (e.g., in the VMs or the host machines that host the VMs). The log application 116 collects, organizes, and filters the received logs. As an example, a logical router can generate a log message when an interface of the router goes down or its configuration is changed. As another example, a web server or a database server (e.g., any of VM1-VM4) might send an access-denied event to a log server when an unauthorized user tries to connect to the web or database server.

The logging protocol, in some embodiments, uses a transport layer protocol such as User Datagram Protocol (UDP) to transmit the event messages across the network. In some such embodiments, the logging protocol uses a particular UDP port number (e.g., UDP port 514) to send the log messages to a log server, while a log application running on the log server listens on this particular port for received log events. Since UDP is a connectionless protocol, no confirmation or acknowledgment is received back from the log server. Lack of acknowledgment can translate to missing an event (however important) when the event message (i.e., one or more packets in the message) does not reach the log application. For this reason, some network devices, instead of UDP, use the Transmission Control Protocol (TCP) as the transport layer protocol. However, TCP can also be prone to loss of network events at critical moments. As an example, when a log server is overloaded and cannot accept any more messages, an important TCP log message could easily be missed by the server.

The log agents 155, in addition to receiving the log messages and forwarding them to the log application, in some embodiments, are sliced to multiple instances, each of which, provides log messaging services for a different logical network. For example, in the illustrated example, log server 110 is responsible for providing event monitoring services for a particular set of logical networks that are implemented by the illustrated physical network infrastructure. As such, the log agents (a particular instance of the agents) only send log messages that belong to the particular set of logical networks to the log server 110. Since the host machines may host other VMs that belong to other logical networks, other instances of the log agents may send log messages from those other logical networks to other log servers that are responsible for providing event monitoring services to those logical networks.

The proxy instance 114, in some embodiments, is an intermediary between the log application 116 and the NIC 112, which receives different event messages, sent for the log application 116, from different network elements. The proxy instance 114, as will be described in great detail below, determines whether the log application 116 is online or offline. For example, the log application 116 might be temporarily offline during an upgrade process. The proxy instance 114 sends the received log messages to the log application 116 when the application is online, and sends the log messages to buffer 118 when the application is offline. As soon as the application is back online, the proxy instance 114 retrieves the buffered log messages from the buffer 118 and forwards them to the log application 116 (in addition to any incoming log messages received from the NIC 112). This way, all the log connections (current and new) outlive the log application 116 during downtime.

The log application 116 in the illustrated example, is a standalone application (i.e., a single application executing on a single log server). As will be described below by reference to FIG. 5, a log application can also be a distributed application, several instances of which execute on several different devices in a cluster (e.g., a cluster of virtual log servers). In some embodiments, the same log application 116 generates different network analysis reports based on the received events, while in other embodiments another analytical system (not shown) receives the log data from the log application and generates the required reports (e.g., in response to a network administrator's query, automatically based on importance level of events, etc.).

One of ordinary skill in the art would realize that the number of the host machines and VMs illustrated in the figure are exemplary and a logical network for a tenant of a hosting system may span a multitude of host machines (and third-party hardware switches), and logically connect a large number of DCNs to each other (and to several other physical devices that are connected to the hardware switches). Additionally, while shown as VMs in this figure and other figures below, it should be understood that other types of data compute nodes (e.g., namespaces, containers, etc.) may connect to logical forwarding elements in some embodiments. Furthermore, each host machine includes many more elements besides the illustrated elements, which are not shown in the figure for simplicity of description.

The above introduced the general concepts of a proxy instance for an event monitoring application that provides event monitoring services for network elements of one or more logical networks implemented by a hosting system. In the following, Section I describes implementation of a proxy instance for a standalone event monitoring application that executes on a single log server. Next, Section II describes a clustered implementation of proxy instances for a distributed event monitoring application, different instances of which operate in different log servers of a log cluster. Following Section II, Section III describes uninterrupted upgrading of a proxy instance with zero downtime. Section IV then describes the electronic system with which some embodiments of the invention are implemented.

I. Standalone Log Server

Some embodiments implement the method of decoupling network connections from a log application differently based on whether the log application is a standalone application or a distributed application. For a standalone log application, some embodiments provide a proxy instance that is bound to one or more port numbers of a network interface (of a log server) that were originally allocated to a log application to listen on. The proxy instance of some such embodiments listens on these allocated ports for any incoming network connections and the log application listens on a local host (e.g., a loopback interface having an IP address of 127.0.0.1) instead.

When the log application is active, the proxy instance forwards all the incoming connections to the log application through the loopback interface. However, during the time that the log application is temporarily down, the proxy instance switches the current log application connections to a buffer in a local data storage. Any new incoming connections received (from a network interface of the device) during the downtime of the application will also be forwarded to the buffer by the proxy instance. As soon as the log application is back up and running, the proxy instance retrieves the buffered connections from the storage and switch them to the log application, along with any new incoming connection received from the network interface.

Figure 2:
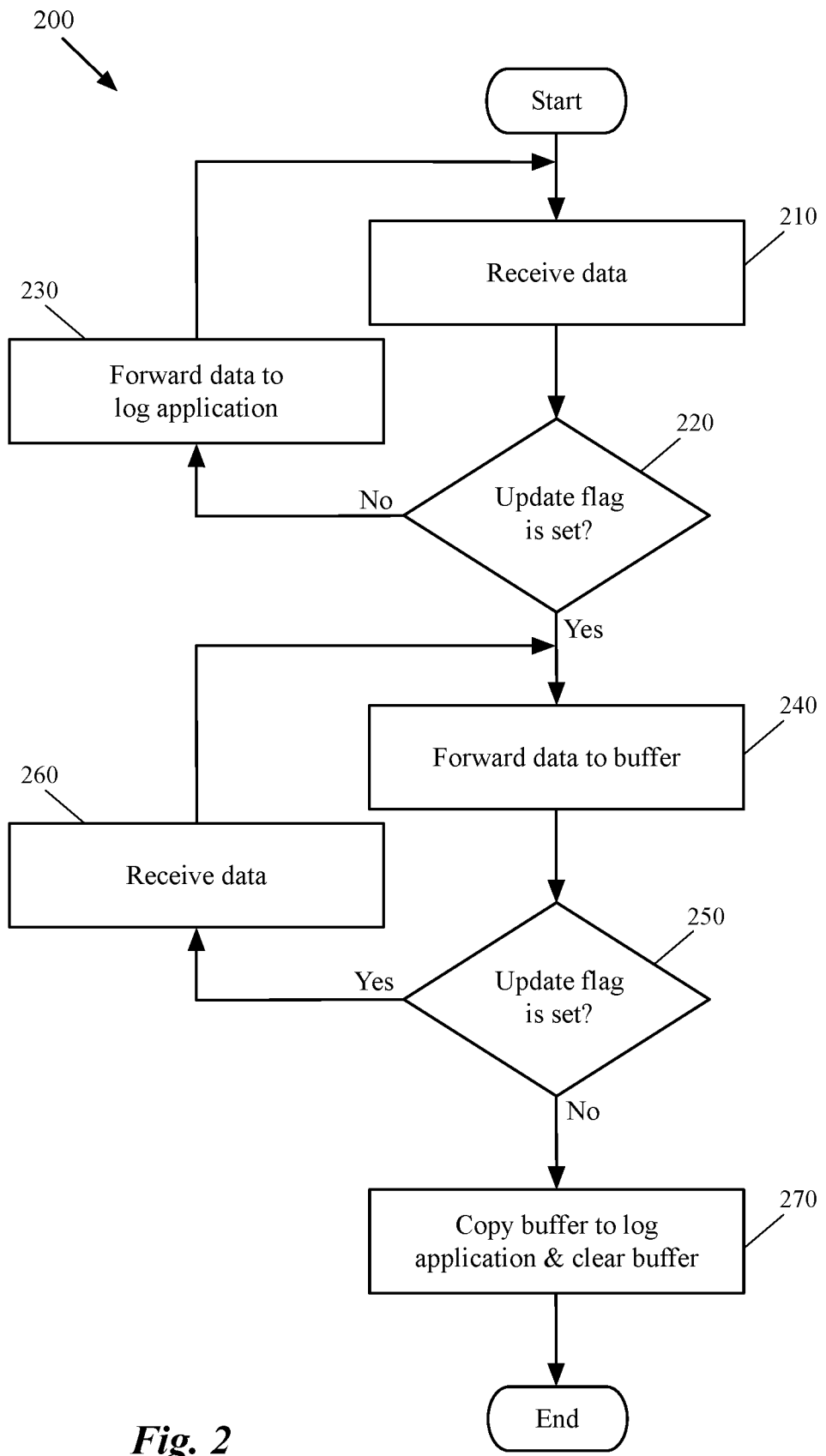
FIG. 2 conceptually illustrates a process of some embodiments that receives incoming data for an application from a network interface and forwards the received data to different destinations based on the status of the application.

FIG. 2 conceptually illustrates a process 200 of some embodiments that receives incoming data from a network interface and forwards the received data to different destinations based on the status of a log application. The process 200, in some embodiments, is performed by a proxy instance that is placed between a network interface of a device (e.g., a virtual NIC of a VM) and a log application that is operating on the device. The process of FIG. 2 will be described by reference to the four operational stages 305-320 of FIG. 3, which illustrates a proxy instance that switches between communication with a log application and a buffer in order to keep the network connections with the application alive during a downtime of the application.

The process starts by receiving (at 210) data that is sent for a log application from a network interface of a device. The data is identified as destined for the log application based on destination addresses that are included in packet headers of the received data. For Example, when a destination transport layer address of a packet includes a particular port number, on which, the log application listens, the packet is determined to be destined for the log application. The received packets might belong to an existing connection that has already been established with the log application or they might be received for establishing new connections. Either way, after receiving the data, the process determines (at 220) whether the log application is available before forwarding the received data to the log application.

In some embodiments, before a log application goes offline (e.g., for an upgrade process), a particular flag for the process is set on. This particular flag informs the process of a temporary downtime for the application. Therefore, the process by checking this particular flag can realize whether the application is up or down. When the process determines that the particular flag is not set on (i.e., the application is up and active), the process forwards (at 230) the received data to the log application without performing any extra actions.

After forwarding the data to the log application, the process returns to operation 210 for receiving additional data (from the network interface). That is, the process starts listening on the ports of the network interface that are dedicated to data communication for the log application. The process iteratively listens on these ports and forwards the incoming data to the log application as long as the process determines that the update flag is not set on and the application is available. However, when the process determines (at 220) that the update flag is set on, the process starts forwarding (at 240) the incoming connections to a buffer.

Figure 3:
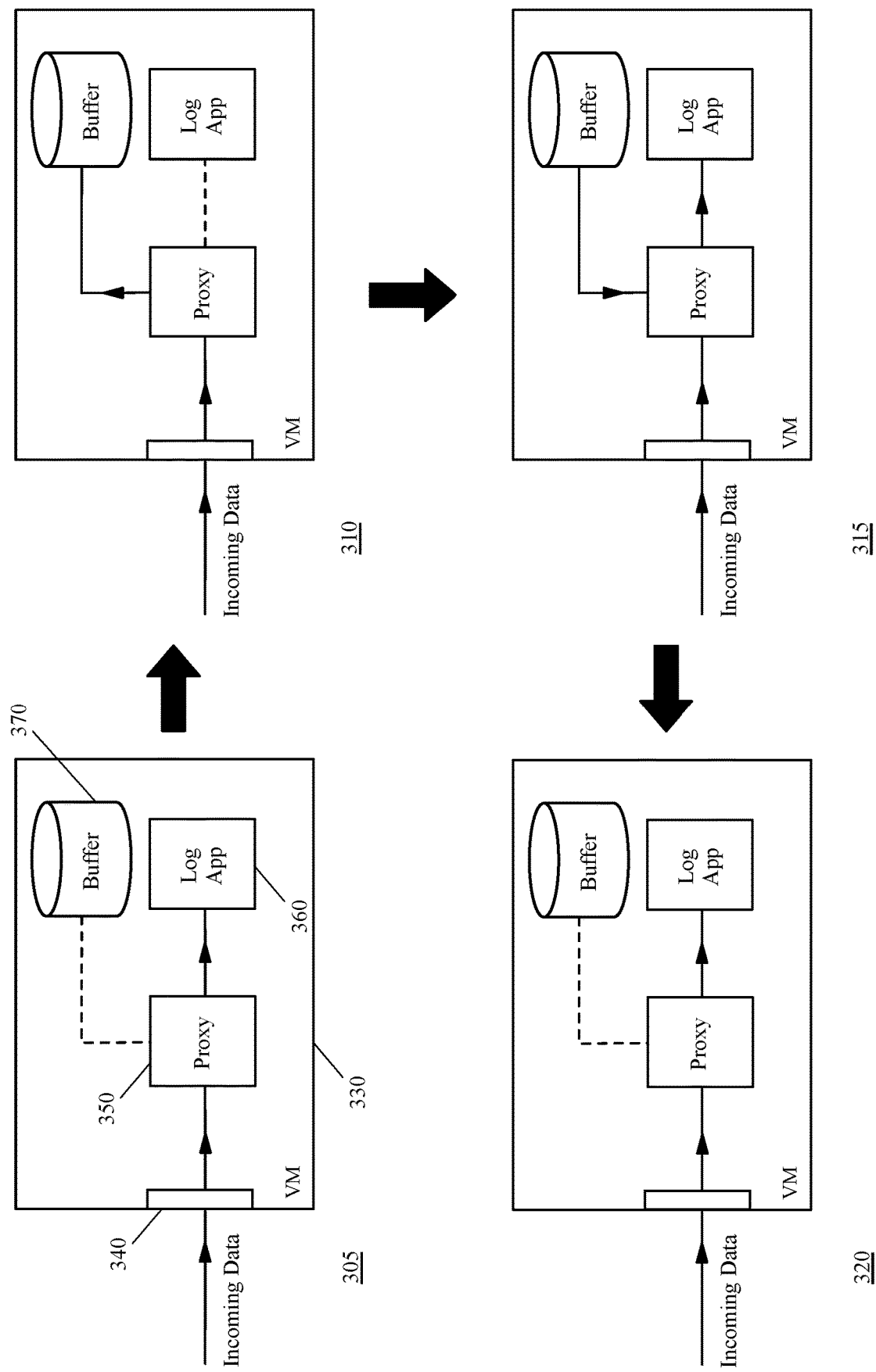
FIG. 3 illustrates a proxy instance that switches between communication with a log application and a buffer in order to keep the network connections with the application alive during a downtime of the application.

The first stage 305 of FIG. 3 includes a VM server 330 that hosts a log application 360 for providing event monitoring services to one or more networks. As described above, the one or more networks could be logical networks of one or more tenants of a datacenter, all of the logical networks that are implemented by a physical network infrastructure, or any combination of logical and physical networks. The log server 330 also includes a network interface 340, a buffer storage 370, and a proxy instance 350 that receives the incoming data from the network interface 340 on behalf of the log application 360.

At this first stage 305, the log application 360 is active (online) and as such, the proxy instance 350 is simply passing through all the incoming data received from the network interface 340 to the log application. The solid line between the network interface 340, the proxy instance 350, and the log application 360 shows this direct communication between the interface, proxy, and the application. On the other hand, the dashed line between the proxy instance 350 and the buffer 370 shows that currently there is no communication between these elements and no data is being forwarded to the buffer 370.

Returning to FIG. 2, when the process determines that the particular flag is set on (i.e., the application is temporarily down), the process forwards (at 240) the received data to a buffer allocated for this purpose in a local data storage of the device. The flag can be set on, in some embodiments, by an API call received from the management and control plane. That is, whenever an updated version of the log application is available to install, the management and control system sends an API to the log server to set the update flag on in the server. Similarly, when the upgrade process is finished, the log server receives another message to set the update flag off.

The process of some embodiments transfers the current connections of the log application to the buffer and establishes new connections to the buffer for any new incoming connections from the network interface. Since the log messages are often large, the log application may go offline in the middle of a connection with a device that is transmitting a large log message to the application. In such a case, the network proxy does not shut down the connection and instead transfers the connection to the buffer in order to save the current connection. After forwarding the received data to the buffer, the process determines (at 250) whether the update flag is set off or is still on. In other words, the process determines whether the log application has become available or it is still down.

When the process determines that the particular flag is still on (i.e., the application is offline), the process receives (at 260) new incoming data from the network interface and returns to operation 240 to forward the received data to the buffer while the application is down. That is, the process iteratively listens on the log application ports and forwards the incoming data to the buffer as long as the process determines that the update flag is set on and the application is not available.

The second stage 310 of FIG. 3 shows that the log application has become unavailable and the proxy instance 350 has started forwarding the incoming connections to the buffer 370. The dashed line between the proxy instance and the application shows that the communication between these two elements has stopped and instead a new communication is established between the proxy instance 350 and the buffer 370 (shown by the solid line between these two elements). As shown in this stage, any incoming connection (data) received from the network interface 340 is forwarded to the buffer 370 instead of the log application 360.

when the process determines (at 250) that the update flag is set off (i.e., the log application is back online), the process copies (at 270) the buffered data to log application and clears the buffer. That is, the process generates new connections to the log application for all the connections that were forwarded to the buffer storage. After forwarding the buffered data from the storage to the application, the process removes the data from the storage and clears the buffer up for next round of buffering. The process then ends.

The illustrated process shows an updating cycle of a log application during which the application turns offline for a short period of time and turns back online after the short period is lapsed. The specific operations of the process 200 may not be performed in the exact order shown and described. For example, the process 200 does not necessarily check the update flag (at 220) each time a new set of data is received. Instead of, or in conjunction with, receiving data, the process of some embodiments proceed to checking this flag each time the status of the flag is changed. That is, checking the update flag includes an event driven sub-process. When a specified event occurs (e.g., the status of the flag is changed from on to off, or from off to on) the sub-process causes the process to proceed to checking the status of the flag (i.e., proceed to operation 220) irrespective of what the next operation for the process is.

Furthermore, the specific operations may not be performed in one continuous series of operations, and different specific operations may be performed in different embodiments. One of ordinary skill in the art would realize that the process 200 could be implemented using several sub-processes, or as part of a larger macro process.

The Third stage 315 of FIG. 3 shows that the log application 360 has become available again. Therefore, the proxy instance 350, in addition to new incoming data received from the network interface 340, forwards the data that has been buffered in the buffer 370 to the log application 360. The solid lines between the buffer and the proxy instance and the direction of the arrow show that the proxy instance is receiving the buffered data from the storage and forwarding the buffered data to the log application. Also, the solid line between the interface 340, proxy instance 350, and log application 360 shows that the proxy instance also forwards the new incoming data received from the network interface 340 to the log application at the same time.

The fourth stage 320 shows that the buffered data is completely forwarded to the log application and as such, there is no more data communication between the proxy instance 350 and the buffer 370 (as shown by the dashed line between these two elements). That is, similar to the first stage 305, since the log application 360 is active again, the proxy instance 350 is simply passing through all the incoming data received from the network interface 340 to the log application.

As described above, the proxy instance of some embodiments listens on the ports that are allocated for a log application's data communication in order to receive incoming network connections destined for the log application. The proxy instance forwards the incoming connections to the log application through a loopback interface on which the log application listens. The port numbers of an external interface of a device that are dedicated to a log application and on which the proxy instance listens, in some embodiments, are divided to (1) log ports, through which the different generated events are received and (2) admin ports, through which admin queries and other API calls are received.

The log application, instead of the dedicated ports, listens on a loopback interface (also referred to as a local host), through which the incoming events are received from the proxy instance. Through the loopback interface, the proxy instance mirrors incoming connections to the log application when the log application is active and online. That is, by default, the proxy instance simply passes the received data through to the log application to minimize the overhead.

However, when the proxy instance is notified of an upgrade event (e.g., through an API call), the proxy instance starts redirecting the incoming traffic to a disk-backed buffer. In some embodiments, however, not all of the network traffic destined for the log application is buffered during the application's downtime.

In some embodiments, only the log data which arrives at a log port of the interface is buffered by the proxy instance when the log application is offline. That is, other data sent to the log application (e.g., admin and UI queries, and other API calls) are simply rejected or denied at the external interface of the device and won't be buffered by the proxy instance. In other words, in some embodiments, during the downtime, all the connections (current and new) to a log port of an external interface of a device will be redirected to a buffer, while the current connections to the log application through other ports such as an API port will be closed and any new connections of this kind will be denied.

The reason for denying the API calls at the interface is that some embodiments use other protocols than UDP to transmit API calls, and as such the API calls are buffered at the sender's side when the sender does not receive an acknowledgment back. That is, when a sender application (e.g. a network management application running on a manager machine) sends a packet (e.g., an HTTP packet) in an API call to a log application and does not receive an acknowledgement back from the log application (because the application is down), the sender application buffers the packet for resubmission. Therefore, this type of data is not required to be buffered for a second time at the log application side (by the proxy instance).

It is important to note that a log port (or an API port) of an interface is not necessarily a physical port of a physical interface in some embodiments. For instance, a log port may include a particular port number (e.g., in the transport layer) which is allocated to log messages defined in a logging protocol. When a packet of an event message that carries the particular port number in one of the packet's headers (e.g., L4 destination address) reaches the interface, the packet is said to be arrived at the particular port of the interface. In some embodiments, the interface that receives the events, can be a virtual interface (e.g., of a virtual machine) and not necessarily a physical interface.

Figure 4:
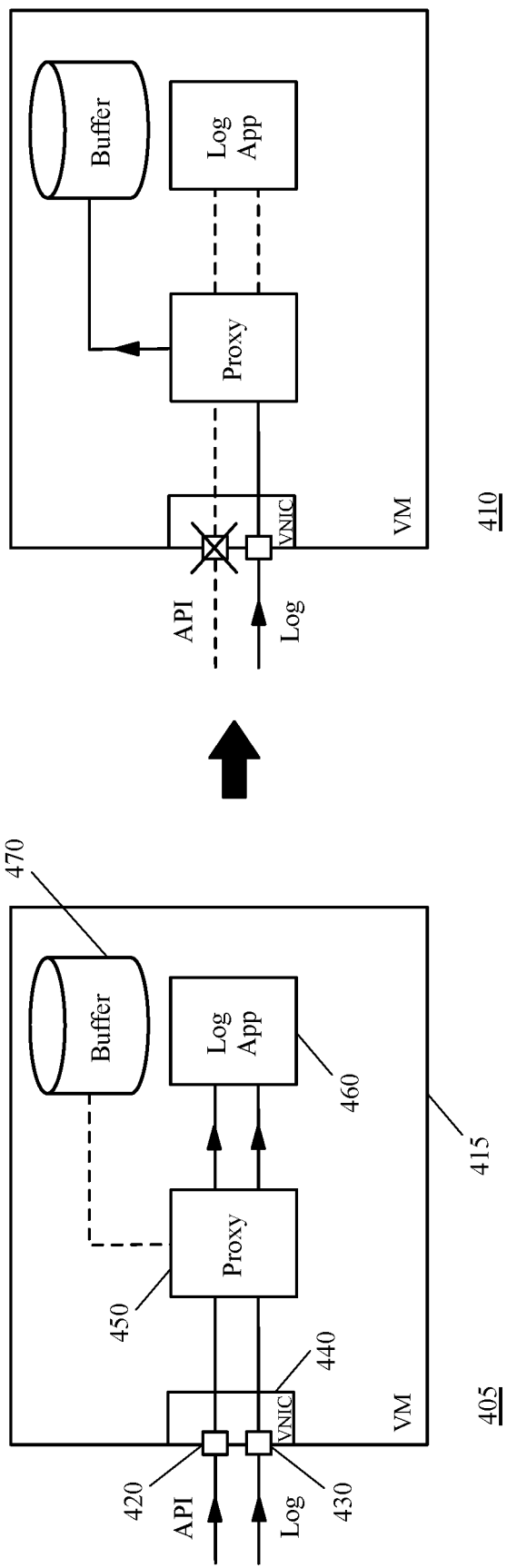
FIG. 4 illustrates a proxy instance that during a log application's downtime only buffers the log data and rejects API calls and other data sent for the log application.

FIG. 4 illustrates a proxy instance that during a log application's downtime only buffers the log data and rejects API calls and other data sent for the log application. Specifically, this figure shows, through two operational stages 405 and 410, a proxy instance operating in a log server that during a log application's downtime (1) buffers log data received from a network interface and (2) rejects other data sent for the application. The figure includes a virtual log server 415 that includes a virtual network interface controller (VNIC) 440 and a buffer storage 470, and executes a proxy instance 450 and a log application 460.

The first stage 405 shows that the VNIC is receiving log data through port 430 and API data through port 420 from other network devices, users, and/or applications. As discussed above, the VNIC ports 420 and 430 are not real physical ports in some embodiments. These ports symbolize particular port numbers that are included in the packet headers (e.g., in packets' L4 TCP and/or UDP headers) to specify which type of data the packets carry and for which application the packets are destined. The log data, in some embodiments, includes event messages that other network elements (e.g., logical and physical forwarding elements, virtual and physical machines, etc.) generate and send to the log application 460. The API data, in some embodiments, includes administrative and user interface (UI) queries and other API calls received from other applications (e.g., an analytical application) that request event data from the log application 460 in order to generate different types of reports or for other reasons.

In the first stage 405, the log application 460 is active and as such, the proxy instance 450 is simply passing through all the incoming data received from the VNIC 440, including API data and log data, to the log application. The solid lines and the direction of arrows on the lines between the proxy instance 450 and the log application 460 show that every type of data that is received through the ports 420 and 430 are passed through to the log application 460 by the proxy instance 450. The dashed line between the proxy instance 450 and the buffer 470 shows that currently there is no communication between the proxy and the buffer and no data is being forwarded to the buffer 470 by the proxy instance 450.

At the second stage 410, the log application 460 has become offline. For example, the application has received a message informing the application that an updated version of the application is available and as a result the application is rebooting to receive the updated configuration. Some embodiments, before sending any message to the application, send a message to the proxy instance (e.g., set an update flag in the proxy on) informing the proxy that the application is going to be updated. Upon receiving this message, the proxy cuts the communication with the log application and starts buffering the log data in the buffer 470.

As shown in the second stage, the proxy instance 450 has stopped receiving anymore API data from the API port 420, while it continues on receiving log data through log port 430. However, instead of sending the received log data to the log application 460, the proxy instance is sending the received log data to the buffer 470. When the update process (or any other process that has caused the log application to turn down) is finished, as described above, the proxy instance retrieves the buffered data from buffer 470 and forwards this data to the log application 460.

II. Log Server Cluster

For large networks (e.g., datacenter networks) with a large number of network resources capable of generating network events, a standalone log application running on a single machine might not be sufficient to handle the event monitoring task. Instead, a distributed log application that runs on a cluster of log servers performs the event monitoring functionality. In a clustered implementation of the log application, where several different log servers of a cluster execute different instances of the log application, when one of the log servers is down, the connections of that server can be redirected to another server of the cluster. That is, when an instance of the log application running on a node (i.e., a log server) of the cluster fails, an integrated load balancer fails over connections with the failed log instance to another instance of the application that executes on another node of the cluster.

During the failover process, however, the possibility of losing one or more event messages still exists (e.g., during the switching time from one node to another). Therefore, a proxy instance that redirects and buffers incoming log data for an offline instance of a distributed log application is still required. For API traffic sent to an offline log instance, however, instead of denying new API connections, some embodiments close the existing API connections and redirect new connections to another node of the cluster. Some embodiments redirect the incoming API traffic to other available instances of the log application in a particular manner. For example, for each new connection that is received, some embodiments redirect the connection to a different node of the cluster using a round-robin pattern.

Forwarding new API connections to other nodes allows new connections (e.g., HTTP connections) continue to be made throughout the upgrade process of a log instance, without any change in buffering the event data. Once the upgrade is completed, some embodiments close the connections to the remote instance of the log application and create new connections to the local and upgraded instance of the log application. In order to redirect the connections to remote nodes, a local proxy instance should be able to communicate to other remote instances of the log application in a manner other than through a loopback interface (through which a proxy instance communicates with a standalone log application). This is because the loopback interface can be used only for internal communications of a single machine and no data can be passed to a remote node through deployments of a loopback interface.

In a clustered implementation of a log application, some embodiments employ a virtual interface of an overlay network between each pair of local proxy instance and local log instance (of the distributed log application). In some embodiments, instead of binding to a loopback interface, a local log instance is bound to its corresponding virtual interface. The local proxy instance of some such embodiments forwards the incoming log and API data to the local log instance through this virtual interface when the log instance in active and online. When the local log instance is offline though, the local proxy instance (1) buffers the log data in the same manner the log data is buffered for a standalone log application, and (2) redirects the incoming API data (instead of rejecting this data) to a remote log instance running on a remote node of the cluster using the same virtual interface.

Some embodiments establish a tunnel (in the overlay network) between the virtual interface of the local node and the virtual interface of a remote node and tunnel the API packets to the remote virtual interface to be forwarded to a corresponding remote log instance. That is, the local virtual interface encapsulates the incoming packets received from the proxy instance with a destination address of the remote virtual interface using a particular tunneling protocol (e.g., VXLAN, Geneve, STT, etc.) before sending the packets to the remote virtual interface. When the remote virtual interface receives the encapsulated packets, it decapsulates the packets and forwards them to the remote log instance to process the packets (e.g., to respond to a UI query). Running on top of an overlay network ensures any traffic sent to a log application's ports not exposed by the proxy is generated by an approved node, and as such there is no need for verifying cluster membership for every internal API request.

Figure 5:
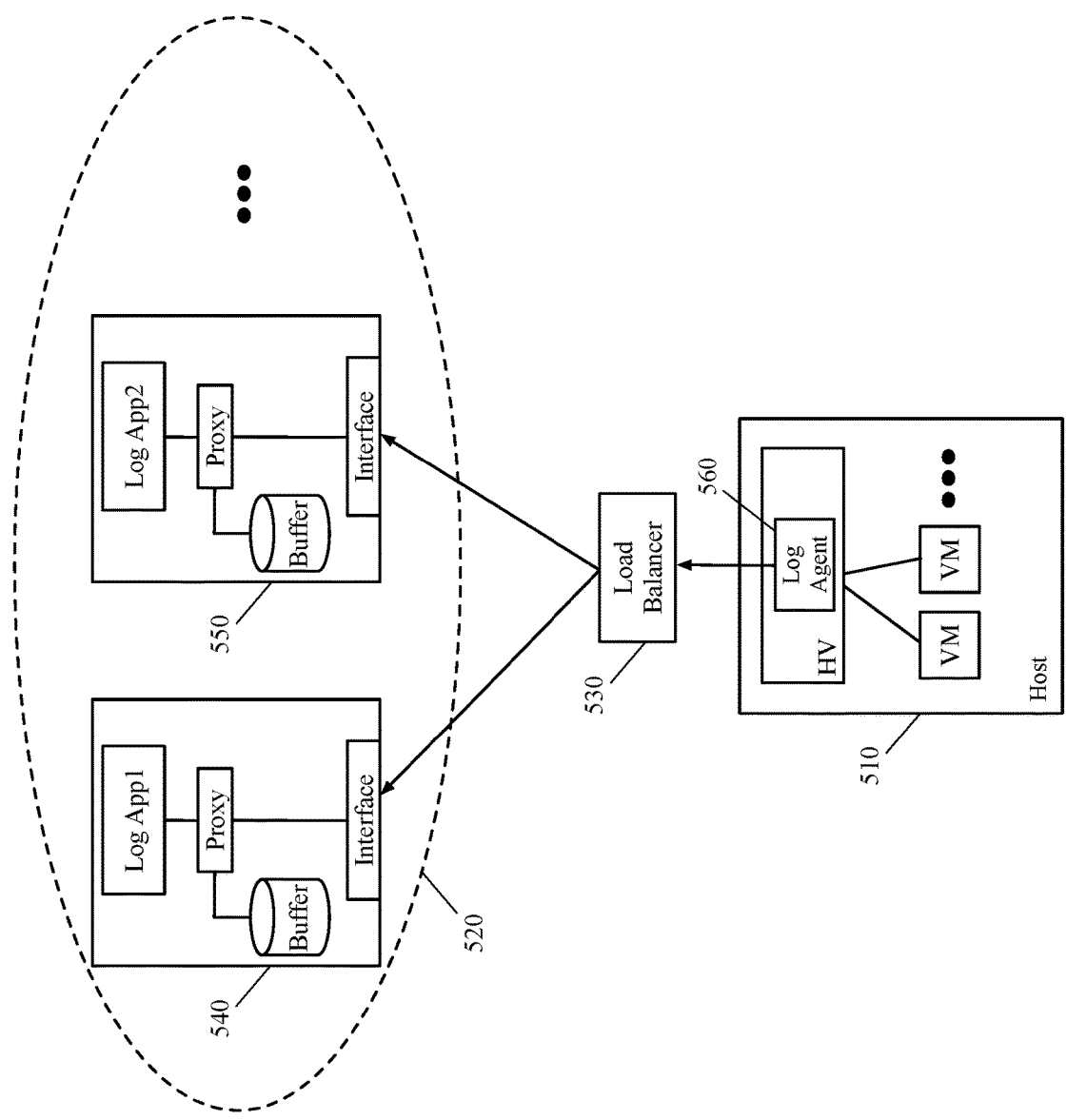
FIG. 5 illustrates a clustered implementation of a log application, in which different instances of a distributed log application runs on different log servers of a cluster to provide event monitoring services for one or more networks.

FIG. 5 illustrates a clustered implementation of a log application, in which different instances of a distributed log application runs on different log servers of a cluster to provide event monitoring services for one or more networks. The figure includes a host machine 510, a log server cluster 520, and a load balancer 530. The host machine 510, similar to the host machines shown in FIG. 1, includes a hypervisor that is connected to different virtual machines. The hypervisor also executes a log agent 560 that receives different log messages from different network elements running on the host machine 510 and forwards these messages to a distributed log application operating on the log servers of the cluster 530. However, unlike FIG. 1, in which multiple log agents operating in multiple host machines communicate with a single log server, in FIG. 5, a single log agent 560 operating in a host machine 510 communicates with a cluster of log servers.

As shown in this figure, the log server cluster 520 includes log servers 540 and 550, as well as several other log servers. Each one of the log servers can be a VM that operates in a host machine. One or more log servers may share a same host machine. Each one of these log servers executes an instance of the log application which receives its data (log messages and other data) from a corresponding proxy instance. The log agent 560 sends the generated log messages to a virtual address (e.g., a virtual IP address) defined for the load balancer 530. The load balancer 530, after receiving a log message, based on an algorithm defined for balancing the load on distributed log applications, sends the log message to the best candidate for processing the message. The algorithm may be defined based on the network bandwidth of each node, the workload each node is processing, round robin, or based on any other manner. After selecting the best candidate, load balancer 520 sends the received log message to the selected log server (i.e., to the log server's network interface).

Figure 6:
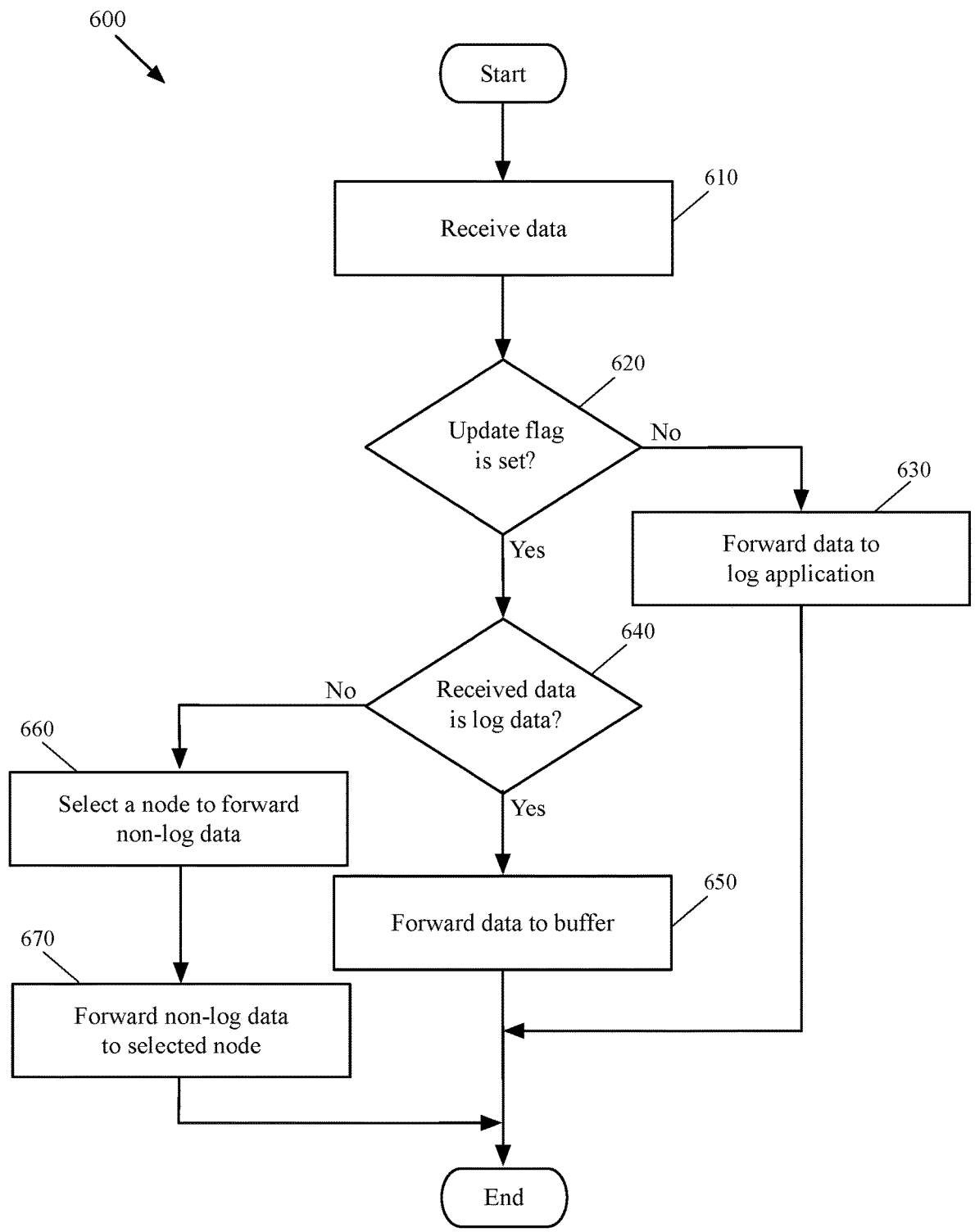
FIG. 6 conceptually illustrates a process that receives incoming data destined for a log application and forwards the received data to different destinations based on the type of data when the log application is offline.

FIG. 6 conceptually illustrates a process 600 of some embodiments that receives incoming data destined for a log application and forwards the received data to different destinations based on the type of data when the log application is offline. The process 600, in some embodiments, is performed by a proxy instance that is placed between a network interface of a log server (e.g., a virtual NIC of a VM) and a local instance of a distributed log application that is operating on the log server. The process of FIG. 6 will be described by reference to the two operational stages 705 and 710 of FIG. 7, which illustrates a proxy instance that when a local instance of a log application is down, buffers log data received for the local instance in a storage, but forwards API calls received for the same local instance to a remote instance of the application to process the API calls.

The process starts by receiving (at 610) data that is sent for an instance of a distributed log application from a network interface of a log server. The data is identified as destined for the log application based on destination addresses that are included in packet headers in the received data. For Example, when a destination transport layer address of a packet includes a particular port number, on which, the log application listens, the packet is determined to be destined for the log application. The received packets might belong to log data sent by network elements, or they might belong to API data received from other sources such as queries sent from other applications or a user.

After receiving the data, the process determines (at 620) whether the log application is available before forwarding the received data to the log application. As described before, when a log application is temporarily down (e.g., for an upgrade process or any other reason), a particular flag informative of such a downtime is set on. As such, the process by checking this particular flag can realize whether the application is down or not. When the process determines that the particular flag is not set on (i.e., the application is up and active), the process forwards (at 630) the received data (both log data and API data) to the log application without performing any extra actions. The process then ends.

On the hand, when the process determines (at 620) that the update flag is set on, the process determines (at 640) whether the incoming data is received from a log port or the incoming data is received from an API port. That is, the process determines whether the packets are carrying packet headers with a port number that is dedicated to log data, or the packets are carrying packet headers with a port number that is dedicated to API data.

Figure 7:
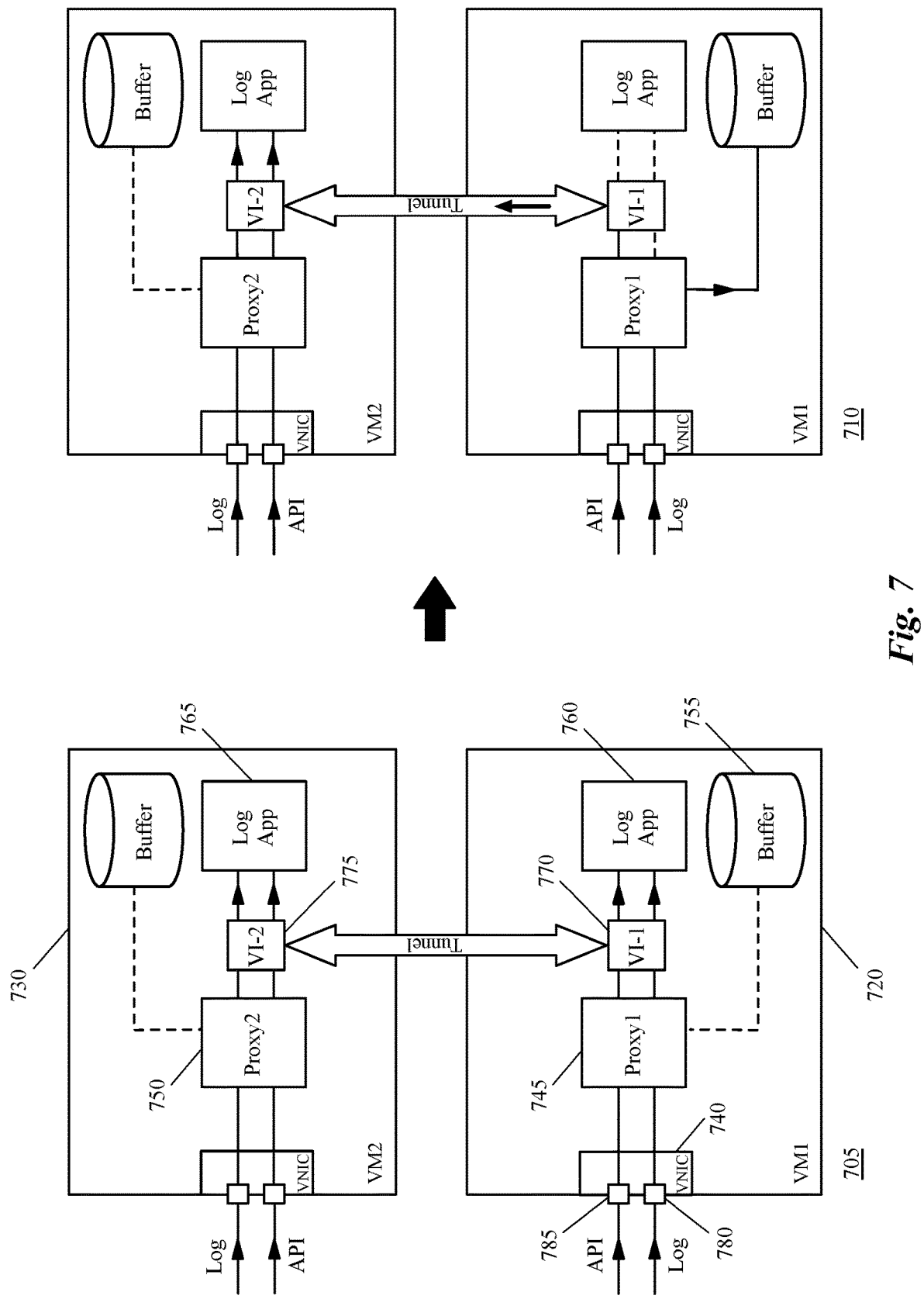
FIG. 7 illustrates a proxy instance that when a local instance of a log application is down, buffers log data received for the local instance in a storage, but forwards API calls received for the same local instance to a remote instance of the application to process the API calls.

The first stage 705 of FIG. 7 includes two VM servers 720 and 730 (from a server cluster) that hosts two different log instances 760 and 765 of a distributed log application that provides distributed event monitoring services for network elements of one or more networks. As described above, the one or more networks could be logical networks of one or more tenants of a datacenter, all of the logical networks that are implemented by a physical network infrastructure, or any combination of logical and physical network elements of different types of networks. Each one of the log servers 720 and 730 includes a VNIC 740 and a buffer storage 755. Additionally, log server 720 has a proxy instance 745 that receives incoming data from the network interface 740 on behalf of the log application instance 760.

The proxy instance 745, however, does not send the received data directly to the log instance 760. As shown in the figure, a virtual interface 770 is employed between the proxy and log instances. This virtual interface has a unique address (e.g., an IP address) through which the proxy instance 745 communicates with the log instance 760 (as well as other log instances running on other log servers of the cluster). That is, instead of using a loopback interface as a means for transmitting the received to the log instance, proxy instance 745 uses a virtual interface for this purpose. As described above, creating a virtual interface (e.g., with Linux bridge) that belongs to an overlay network, makes secure communications of data with other instances of log application that run on other log servers through an overlay network possible.

Similar to virtual interface 770, proxy instance 750 of the log server 730, also uses a virtual interface 775 in order to communicate with the log instance 765 running on the log server 730, as well as other log instances running on other log servers of the cluster. The virtual interfaces 770 and 775 act as virtual tunnel endpoints (VTEPs) for tunneling data (i.e., API data) between the proxy instance of each log server and the log instance of the other server. In other words, employing a virtual interface by each node allows the node to open connections to remote instances of a log application and, at the same time, prevents external access to the proxy and log instances that operate on the node. One of ordinary skill in the art would realize that the two log servers are exemplary and in reality, a log server cluster that provides event monitoring services includes many more log servers that each has a virtual interface in the overlay network for inter-node tunneling of data.

In order to create an overlay network with a virtual interface created in each node, addition of each new member to the server cluster has to be tracked. Tracking a cluster membership is a process that has to be performed for managing a distributed log application anyway. When a new node attempts to join the cluster, the application makes a request to its local proxy-overlay's membership endpoint that contains a list of its local services as protocol-port pairs, a unique string (e.g., a UUID) to be used to verify the authenticity of the join request, and the address (e.g., HTTPS) of a node already in the cluster to join. This request triggers a blocking request to a remote proxy-overlay's membership endpoint, which contains the body of the original request. On the receiving node's side (i.e., remote proxy), a request to pending members will list all pending requests, including their tokens and node-addresses. Finally, a true or false message for approving the pending requests with their corresponding tokens will finalize the new membership request. If approved, the new node's proxy-overlay will receive a response containing the information it needs to configure the local tunnels that make up the overlay and the new application instance may begin communicating with the rest of the cluster. This way, a secure way for a local proxy instance is created to communicate with remote log application instances.

The first stage 705 of FIG. 7 shows that, the log application instance 760 is active (online) and as such, the proxy instance 745 is simply passing through all the incoming data received from the network interface 740 to the log application instance. That is, any packets received from log port 780 and API port 785, will be forwarded to virtual interface 770, to which the log instance 760 listens. This way, the received data reaches the log instance directly. The solid lines between the network interface 740, proxy instance 745, virtual interface 770, and log application instance 760 and the direction of arrows show this direct communication between the interface and the application instance. On the other hand, the dashed line between the proxy instance 745 and the local buffer 755 shows that currently there is no communication between these elements and no data is being forwarded to the local buffer 755.

The first stage 705 also illustrates a tunnel between the virtual interface 770 operating in the local server 720 and virtual interface 775 operating in the remote server 730. It is important to note that the illustrated tunnel and virtual interfaces are abstract concepts and not real physical elements. As will be described in the next stage of the figure, there is no real connection between two physical elements through which network packets are transmitted. Instead, whenever a packet should be tunneled from one of the virtual interfaces to the other, the packet is sent back from the virtual interface to the VNIC with additional tunneling data and sent from the VNIC of the local server, to the VNIC of the remote server to be forwarded to the remote application instance.

Returning to FIG. 6, when the process determines (at 640) that the incoming data is received from a log port, the process forwards (at 650) the received data to a buffer allocated for this purpose in a local data storage of the device. The process of some embodiments transfers the current connections of the log application to the buffer and establishes new connections to the buffer for any new incoming connections from the network interface. The process then ends. On the other hand, when the process determines that the incoming data is received from an API port, the process selects (at 660) a remote instance of the application to forward the API data to the remote instance. In some embodiments, the process selects the best candidate instance using a round robin pattern to forward the API data. After selecting the best candidate remote instance, the process forwards (at 670) the received API data to the selected instance and ends. For forwarding the API data to a remote instance, the process of some embodiments, establishes a tunnel between the local virtual interface and a remote virtual interface and tunnels the API data to the remote virtual interface.

The specific operations of the process 600 may not be performed in the exact order shown and described. Additionally, the specific operations may not be performed in one continuous series of operations, and different specific operations may be performed in different embodiments. One of ordinary skill in the art would realize that the process 600 could be implemented using several sub-processes, or as part of a larger macro process.

The second stage 710 of FIG. 7 shows that the log application has become unavailable and the proxy instance 745 has started forwarding the incoming log connections to the buffer 755. The dashed line between the proxy instance 745, virtual interface 780, and log instance 760 shows that the communication between these three elements has stopped and instead a new communication is established between the proxy instance 745 and the buffer 755 (shown by the solid line between these two elements). As shown in this stage, any incoming log connection (data) received from the network interface 740 is forwarded to the buffer 755 instead of the log instance 760.

The second stage also shows that the API data received from API port 785 is tunneled (by the overlay virtual interface 770) to the remote log instance 765 through the overlay virtual interface 775. That is, the local proxy 745 encapsulates each API data packet with the local virtual interface 770 as a source VTEP and remote virtual interface 775 as a destination VTEP of the packet and sends the packet through the overlay network to the remote node 730. The physical transmission of packet however, is not in the same way that is illustrated in the figure. That is, an API data packet, after being encapsulated by the local proxy, is sent back to VNIC 740 to be forwarded to a physical NIC of a host machine that hosts the virtual log server 720.

The encapsulated packet is then forwarded from the physical NIC of the host machine that hosts the local virtual log server 720 to a physical NIC of a host machine that hosts the remote virtual log server 730. From there, the packet is forwarded to the VNIC of the remote virtual server, which forwards the packet to the proxy instance 750 based on the encapsulation data in the packet headers. The remote proxy instance 750 decapsulates the packet and forwards it to the remote instance of the log application to process the packet. As described, unlike the standalone implementation of a log application, the API data sent to a distributed log application is not blocked or rejected. Instead, the API data is forwarded to a best remote candidate log instance to process the data.

III. Upgrading Proxy Instance

As described above, a proxy instance decouples network connections to an application and buffers event data that is sent to the application during the application's downtime. Some embodiments provide a novel method for upgrading a proxy instance without any interruption in providing proxy services by the proxy instance. In other words, some embodiments decouple network connections from a proxy instance itself when an upgraded version of the proxy is available, and couple the connections to an upgraded version of the proxy without interrupting the services the proxy provides.

A proxy instance, in some embodiments, is a process instantiated in a kernel or user space of a machine. In some embodiments, the machine (or a hypervisor in charge of the machine) instantiates the proxy instance based on configuration data the machine receives from a management and controller system of a network to which the machine is coupled. When an updated version of a proxy instance is available, some embodiments instantiate an updated version of the proxy instance in the machine instead of upgrading the same proxy instance. In some embodiments, a flag in the newly instantiated proxy is set, which instructs the upgraded proxy instance to retrieve connections from the old proxy instance instead of creating new connections.

In order to receive the current connections from an old proxy (i.e., an old version of the proxy), the upgraded proxy opens a new inter-process communication socket (e.g., a Unix domain socket) and asks the old proxy (through an API call) to send all of its connections to the upgraded proxy through the socket. An inter-process communication (IPC) socket is a mechanism that a log server machine's operating system (or a host machine's operating system that hosts the log server) provides to allow two or more local processes share data with each other. Typically, two different processes are categorized as a client and a server, where the client requests data and the server responds to client's requests. The communications between the two process occurs entirely within the kernel space of the log servers when the processes open the same socket.

In addition to sending data, processes may send file descriptors across an IPC socket connection (e.g., using sendmsg( ) and recvmsg( ) API calls). Each file descriptor, in some embodiments, is a handle to a network connection that is established with the old proxy instance. Upon receiving a connection transfer request from the upgraded proxy, the old proxy of some embodiments sends, on the specified socket, a set of file descriptors, each of which handles one of the connections to the upgraded proxy. In other words, by receiving the file descriptors from the old proxy instance, the upgraded version of the proxy instance inherits the connections from the old proxy instance.

In some embodiments, upon receiving the set of file descriptors from the old proxy, the upgraded proxy instance creates new network connections for receiving the incoming data (e.g., from an interface) using the received file descriptors and begins listening on the newly created connections. At this point, the old proxy stops listening on its connections so that all new incoming data could be received by the upgraded proxy. As soon as the upgraded proxy is activated and starts listening to the connections for new data and the old proxy stops listening, some embodiments remove the old proxy from the machine. This way, there is no downtime for upgrading a proxy instance and no interruption of the services provided by the proxy instance.

Figure 8:
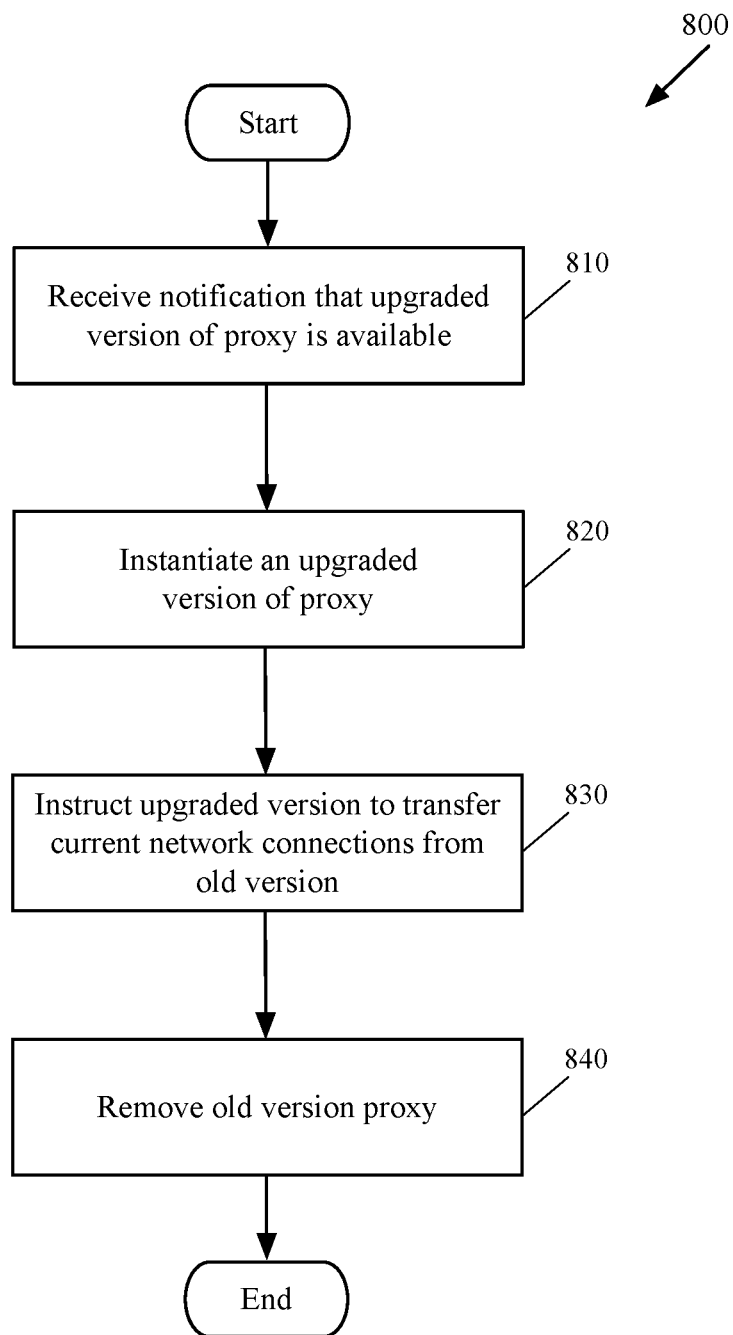
FIG. 8 conceptually illustrates a process of some embodiments for uninterruptedly upgrading a proxy instance such that no data communication between the proxy instance and a log application and/or a data buffer could be lost.

FIG. 8 conceptually illustrates a process 800 of some embodiments for uninterruptedly upgrading a proxy instance such that no data communication between the proxy instance and a log application and/or a data buffer could be lost. In other words, this figure shows how a proxy instance is upgraded with zero downtime and without any interruption in the services of the proxy instance. Process 800, in some embodiments, is performed by an operating system of a log server that instantiates a proxy instance in a log server. In some other embodiments, the process is performed by a hypervisor of a host machine that executes the log server machine and instantiates the proxy instance in the log server machine.

The process starts by receiving (at 810) a notification that an upgraded version of a proxy instance that is currently running on a log server is available. In some embodiments, a log server is notified of an upgrade by the management and control system of the network. Upon receiving the notification, the process instantiates (at 820) an updated version of the proxy instance next to the old version of the proxy. That is, after the notification is received, the log server of some embodiments runs two proxy instances in parallel, where the old proxy has all network connections attached to the old proxy, while the new proxy instance has still no connection attached to the new proxy.

At 830, the process instructs the newly instantiated proxy instance (i.e., the upgraded version of the proxy) to request from the old proxy instance to transfer its current network connections to the new proxy instance. The process of some embodiments does so by setting a flag in the upgraded version on which tells the new proxy to open an IPC socket and send a request to the old version passing the IPC socket's info to the old version. This way, the old version opens the same IPC socket through which the two new and old versions of the proxy instance communicate with each other and transfer the connections from the old version to the new version. After receiving the connections of old proxy instance, the process removes (at 840) the old version from the log server machine.

The specific operations of the process 800 may not be performed in the exact order shown and described. Additionally, the specific operations may not be performed in one continuous series of operations, and different specific operations may be performed in different embodiments. One of ordinary skill in the art would realize that the process 800 could be implemented using several sub-processes, or as part of a larger macro process. For example, operation 830 of this process is divided to a series of sub-processes that are illustrated as different operations of the next figure.

Figure 9:
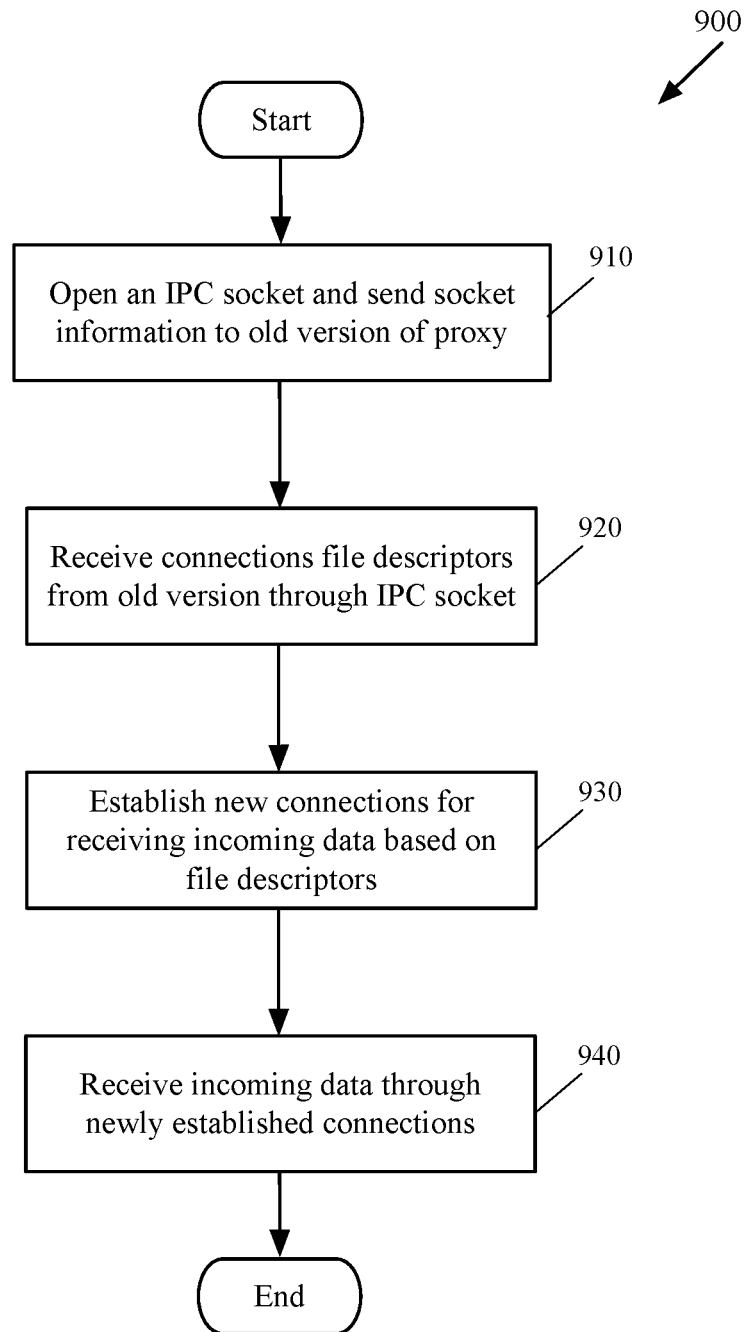
FIG. 9 conceptually illustrates a process for communicating with a currently active proxy instance of a machine to transfer its connections to a newly instantiated proxy instance that is an upgraded version of the active proxy instance.

FIG. 9 conceptually illustrates a process 900 of some embodiments for communicating with a currently active proxy instance of a machine to transfer its connections to a newly instantiated proxy instance that is an upgraded version of the active proxy instance. In other words, this figure shows a series of sub-processes included in operation 830 with reference to FIG. 8 above. Process 900, in some embodiments, is performed by an upgraded version of a proxy instance that has recently been instantiated in a log server. The process starts by opening (at 910) an IPC socket (e.g., a Unix domain socket) and sending a request to an old proxy instance (a current proxy that provides proxy services in the machine) that contains the IPC socket's information. Upon receiving the request, the old proxy instance opens the IPC socket and establishes a connection with the requestor proxy instance to send a set of file descriptors of its current connections to the new proxy instance.

The process receives (at 920) a set of file descriptors from the old proxy instance. Each file descriptor in the set includes a handle to one of the current connections to the old version of the proxy instance. upon receiving the file descriptors, the process establishes (at 930) new network connections in order to receive incoming data that was previously forwarded to the old proxy socket. As soon as the process establishes these connections, the old proxy instance stops listening on the log application ports of the network interface, at which time the process starts listening (at 940) on these ports and receiving incoming data through newly established connections.

The specific operations of the process 900 may not be performed in the exact order shown and described. Additionally, the specific operations may not be performed in one continuous series of operations, and different specific operations may be performed in different embodiments. One of ordinary skill in the art would realize that the process 900 could be implemented using several sub-processes, or as part of a larger macro process.

Figure 10:
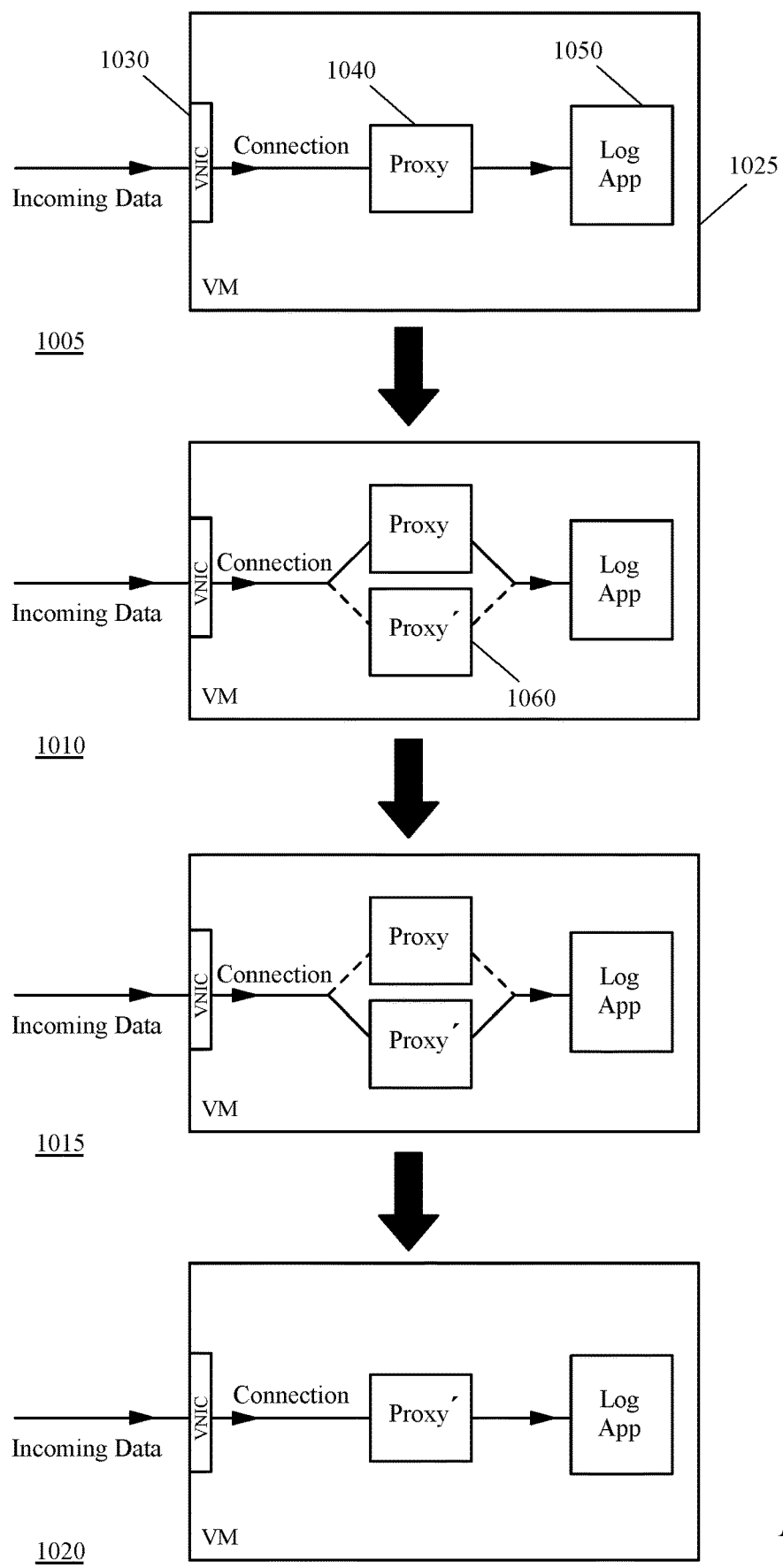
FIG. 10 illustrates the creation of an upgraded version of a proxy instance and replacement of the old version of proxy instance with the upgraded version.

FIG. 10 illustrates, through four operational stages 1005-1020, the creation of an upgraded version of a proxy instance and replacement of the old version of proxy instance with the upgraded version in some embodiments. The figure includes a proxy server 1025 which includes a virtual network interface controller (VNIC) 1030, a proxy instance 1040, and a log application 1050. In the firs stage 1005, proxy instance 1040 is receiving incoming network traffic from the VNIC 1030 and forwards the traffic to a log application (or an instance of the application) 1050. This is because the log application is up and active and as such, the proxy instance is simply passing the received traffic to the application. Otherwise, the proxy instance, as described above, would pass the traffic to a buffer or another remote log server in order to save and/or process the data communicated with the log application during the application's downtime.

The second stage 1010 shows that a second proxy instance 1060 which is an upgraded version of the proxy instance 1040 is created to run in parallel with the proxy instance 1040 in the log server 1025. Proxy instance 1060 is instantiated in the log server because a notification of availability of an upgrade for the proxy instance 1040 is received (e.g., from a controller) and in response the log server has instantiated this proxy instance (instead of turning the old version of the proxy down to upgrade the proxy). At this stage, the new version of the proxy sends a request to the old version along with an IPC socket in order to receive file descriptors of any currently active network connection with the old version from the old version. As shown in the figure, the second stage shows that a solid line, which shows live traffic connection, connects the VNIC 1030 to the log application 1050 through the proxy instance 1040. Conversely, since no live connection is still created for the upgraded version of the proxy, a dashed line connects the proxy instance 1060 to the VNIC 1030 and log application 1060.

In the third stage 1015, the upgraded version 1060 has received the file descriptors and taken over the duties of the old version 1040 (i.e., the new version has started receiving incoming traffic from the VNIC 1030 instead of the old version). In some embodiments, upon receiving the file descriptors from the old proxy, the upgraded proxy instance 1040 creates new network connections for receiving the incoming data (e.g., from the VNIC 1030) using the received file descriptors and begins listening on the newly created connections. As soon as the upgraded version starts to actively listen on the VNIC's ports, the old version 1040 stops receiving any more data from the VNIC. The fourth stage 1020 shows that proxy instance 1060 has replaced the old version 1040 and is now receiving the incoming network traffic from the VNIC 1030 and forwards the traffic to the log application (or an instance of the application) 1050.

The proxy instance, described in the above-mentioned embodiments, can be used for many other reasons and not merely during the downtime of a log application. Providing an access point for additional services could be another reason for decoupling incoming connections from an application using a lightweight proxy instance. Some examples for these additional services include, but are not limited to, securing all inter-node communications (e.g., in a log server cluster), throttling traffic to simulate poor network conditions (e.g., during system development), recording traffic (e.g., for debugging), etc.

For example, a policy to forward all incoming data to a remote node while maintaining the original behavior for a system can be defined. Through such a policy, a test cluster that will receive the same data as production can be set up. As such, changes can be tested with real, live data without having to upgrade an in-use cluster and more effectively evaluate real world performance without having to impact the users. Alternatively, another policy for copying the live traffic to a disk to be replayed later can be defined which can be used to capture events during a particularly demanding period and to replay the captured events to test future performance enhancements.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
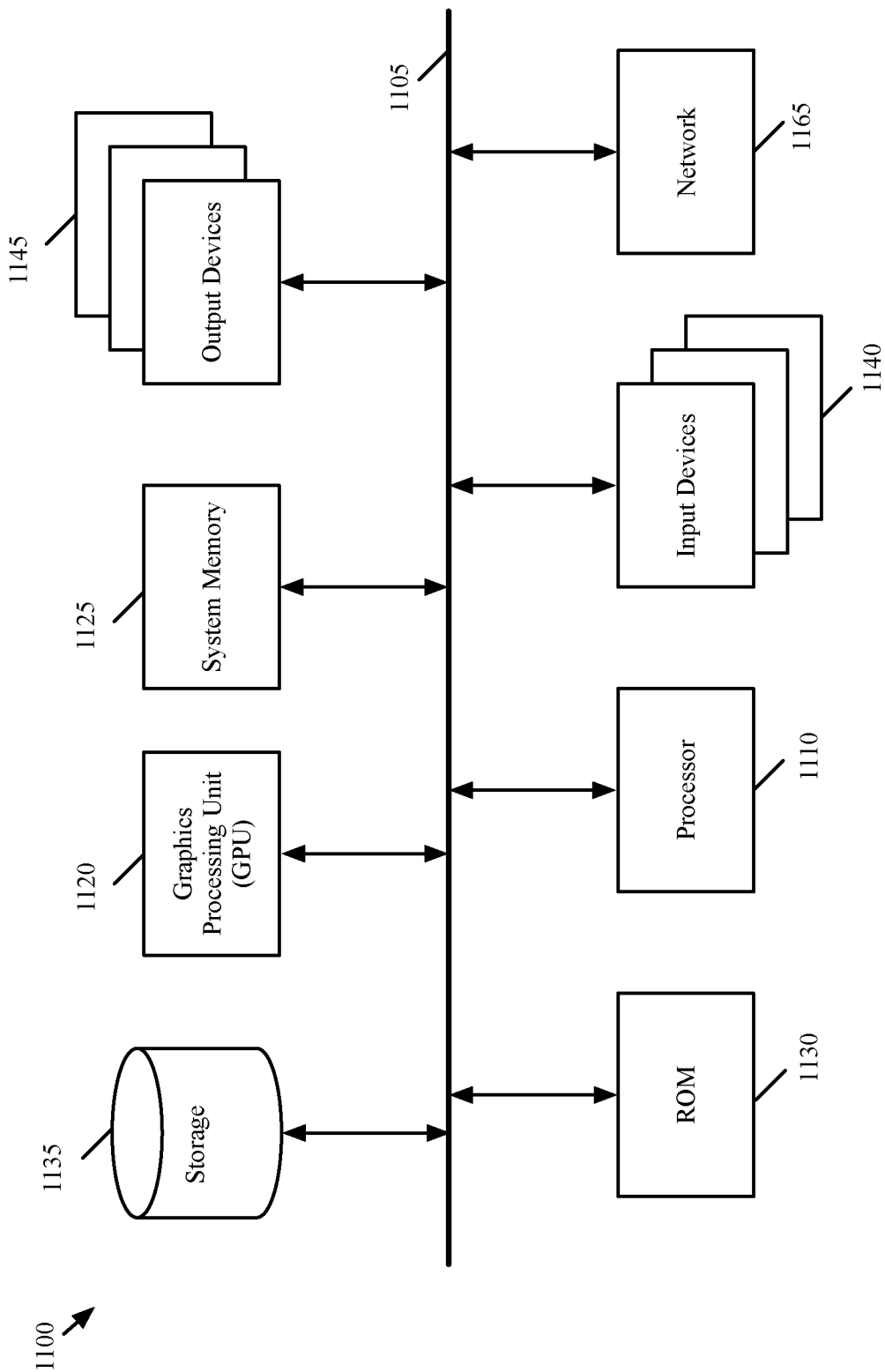
FIG. 11 conceptually illustrates an electronic system with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash memory device, etc., and its corresponding drive) as the permanent storage device. Like the permanent storage device 1135, the system memory 1125 is a read-and-write memory device. However, unlike storage device 1135, the system memory 1125 is a volatile read-and-write memory, such a random access memory. The system memory 1125 stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 2, 6, 8, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for decoupling data communicated with a particular application from the particular application during the particular application's downtime while the particular application is being upgraded, the particular application executing on a first computing machine, the method comprising:
at a proxy executing on the first computing machine,
receiving, from a machine external to the first computing machine, incoming data through an interface of the first computing machine for the particular application;
determining that the particular application is being upgraded and is unavailable to receive incoming data by determining that a particular flag is set on, wherein the particular flag is set on before the particular application is upgraded and set off after the particular application has completed its upgrade; and
based on the determination that the particular application is being upgraded and is unavailable to receive the incoming data, forwarding the incoming data to a data storage of the first computing machine in order to buffer the incoming data until the particular application becomes available to receive the incoming data after it has completed its upgrade.

2. The method of claim 1 further comprising, after buffering the incoming data in the data storage:
determining that the particular application has completed its upgrade and is available to receive data;
retrieving the buffered data from the data storage; and
forwarding the buffered data to the particular application.

3. The method of claim 1, wherein the first computing machine comprises a first virtual machine (VM) and the interface comprises a virtual network interface controller of the VM.

4. The method of claim 3, wherein the first VM executes on a particular host computer and receives the incoming data from a set of one or more VMs that execute on a set of host computers.

5. The method of claim 4, wherein the first VM further receives the incoming data from one or more physical machines that are connected to one or more hardware switches.

6. The method of claim 1, wherein the incoming data comprises log data received from different forwarding elements of a network implemented on a plurality of host computers.

7. The method of claim 6, wherein the incoming data further comprises application programming interface (API) calls received from an analytical application that receives the log data from the particular application and analyses the log data.

8. The method of claim 7 further comprising listening on a first port number for receiving the log data and listening on a second different port number for receiving the API calls.

9. The method of claim 8, where in the first port number is allocated for a syslog protocol while the second port number is allocated for other protocols.

10. The method of claim 8, wherein forwarding the incoming data to the data storage comprises only forwarding the log data to the data storage and not the API calls.

11. The method of claim 10, wherein the interface denies any new API call received for the particular application and closes existing API connections to the particular application while the particular application is being upgraded.

12. The method of claim 1, wherein receiving the incoming data comprises listening on one or more port numbers for receiving the incoming data, wherein the particular application listens on a loopback port number, which is different from the one or more port numbers, for receiving the incoming data.

13. The method of claim 12, wherein forwarding the incoming data to the particular application comprises forwarding the incoming data to the particular application through the loopback port.

14. A non-transitory machine readable medium of a computer storing a proxy program that when executed by at least one processing unit of the computer processes data for a particular application executing on the computer, the program comprising sets of instructions for:
receiving incoming data for the particular application, the incoming data originating from a first machine external to the computer;
determining whether the particular application is being upgraded and is unavailable to receive incoming data by determining whether a particular flag is set on, wherein the particular flag is set on before the particular application is upgraded and set off after the particular application has completed its upgrade;
when the particular flag is set off indicating that the particular application is not being upgraded and is available to receive the incoming data, forwarding the incoming data to the particular application; and
when the particular flag is set on indicating that the particular application is being upgraded and is unavailable to receive the incoming data, forwarding the incoming data to a data storage of the computer in order to buffer the incoming data until the particular application becomes available to receive the incoming data after it has completed its upgrade.

15. The non-transitory machine readable medium of claim 14, wherein the proxy program further comprises sets of instructions for, after buffering the incoming data in the data storage:
determining that the particular application has completed its upgrade and is available to receive data;
receiving the buffered data from the data storage; and
forwarding the buffered data to the particular application.

16. The non-transitory machine readable medium of claim 14, wherein the particular application comprises a log monitoring application, wherein the incoming data comprises log data generated by different network elements and sent to the log monitoring application.

17. The non-transitory machine readable medium of claim 16, wherein the particular application comprises a first instance of the application and the computer comprises a first computer, wherein the log monitoring application comprises at least a second instance instantiated in a data compute node (DCN) executing on a second computer, the second instance also for receiving the log data generated by at least one machine external to the second computer.

18. The non-transitory machine readable medium of claim 17, wherein the first and second instances receive log data from first and second virtual interfaces, respectively, wherein the set of instructions for forwarding the incoming data to the first instance comprises a set of instructions for forwarding the log data to the first virtual interface.

19. The non-transitory machine readable medium of claim 18, wherein the incoming data further comprises application programing interface (API) calls, wherein the first virtual interface forwards the log data to the data storage and the API calls to the second virtual interface to be subsequently forwarded to the second instance.

20. The non-transitory machine readable medium of claim 19, wherein the first virtual interface forwards the API calls to the second virtual interface by encapsulating data packets of the API calls using a particular tunneling protocol and tunneling the encapsulated data packets to the second virtual interface.

21. The non-transitory machine readable medium of claim 14, wherein a second machine executes on the computer, and the proxy program and the particular application both execute on the second machine.

22. The non-transitory machine readable medium of claim 21, wherein the second machine is a virtual machine (VM).

23. The method of claim 1, wherein the machine is a first machine external to the first computing machine, the method further comprising:
   at the proxy:
      receiving, from a second machine external to the first computing machine, incoming data through the interface of the first computing machine for the particular application;
      determining that the particular application is not being upgraded and is available to receive incoming data by determining that the particular flag is set off; and
      based on the determination that the particular application is not being upgraded and is available to receive the incoming data, forwarding the incoming data received from the external second machine to the particular application.

* * * * *